US010915225B2

(12) United States Patent
Jeon

(10) Patent No.: US 10,915,225 B2
(45) Date of Patent: **\*Feb. 9, 2021**

(54) USER TERMINAL APPARATUS AND METHOD OF CONTROLLING THE SAME

(71) Applicant: Samsung Electronics Co., Ltd., Suwon-si (KR)

(72) Inventor: Byeong-yong Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,679

(22) Filed: Sep. 14, 2018

(65) Prior Publication Data

US 2019/0012051 A1 Jan. 10, 2019

Related U.S. Application Data

(63) Continuation of application No. 14/073,211, filed on Nov. 6, 2013, now Pat. No. 10,078,421.

(30) Foreign Application Priority Data

Dec. 5, 2012 (KR) .................. 10-2012-0140580

(51) Int. Cl.
*G06F 3/0482* (2013.01)
*G06F 3/0488* (2013.01)

(52) U.S. Cl.
CPC ........ *G06F 3/0482* (2013.01); *G06F 3/04886* (2013.01)

(58) Field of Classification Search
CPC .................................................... G06F 3/0482
See application file for complete search history.

(56) References Cited

U.S. PATENT DOCUMENTS

| 6,448,987 | B1 | 9/2002 | Easty et al. |
| 7,543,245 | B2 | 6/2009 | Irimajiri |
| 7,877,701 | B2 | 1/2011 | Cohen et al. |
| 8,117,542 | B2 | 2/2012 | Radtke et al. |
| 8,130,075 | B1 * | 3/2012 | Hingole ............... G06F 3/0481 340/5.55 |

(Continued)

FOREIGN PATENT DOCUMENTS

| CN | 1177406 A | 3/1998 |
| CN | 1398366 A | 2/2003 |

(Continued)

OTHER PUBLICATIONS

Australian Office Action dated Oct. 10, 2018, issued in Australian Patent Application No. 2013355450.

(Continued)

*Primary Examiner* — Justin S Lee
(74) *Attorney, Agent, or Firm* — Jefferson IP Law, LLP

(57) ABSTRACT

A user terminal apparatus is provided. The user terminal apparatus includes a display configured to provide a screen including an editing object, a user interface unit configured to receive a user operation, and a controller configured to control to display a first wheel navigation User Interface (UI) in a region of the screen when a preset event is generated, the first wheel navigation UI including at least one editing menu related to an attribute of the editing object and being rotatable according to the user operation.

18 Claims, 28 Drawing Sheets

(56) References Cited

U.S. PATENT DOCUMENTS

| | | |
|---|---|---|
| 8,266,550 B1 | 9/2012 | Cleron et al. |
| 8,321,802 B2 | 11/2012 | Rogers |
| 9,058,092 B2 | 6/2015 | Rogers |
| 2003/0112279 A1 | 6/2003 | Irimajiri |
| 2003/0197736 A1* | 10/2003 | Murphy ............... G06F 3/0236 715/780 |
| 2004/0221243 A1 | 11/2004 | Twerdahl et al. |
| 2006/0036945 A1* | 2/2006 | Radtke ............... G06F 9/451 715/708 |
| 2007/0192742 A1* | 8/2007 | Lee ............... G06F 3/0482 715/828 |
| 2007/0206030 A1* | 9/2007 | Lukis ............... G06T 19/20 345/653 |
| 2007/0220443 A1 | 9/2007 | Cranfill et al. |
| 2007/0220444 A1 | 9/2007 | Sunday et al. |
| 2007/0271528 A1 | 11/2007 | Park et al. |
| 2008/0059913 A1* | 3/2008 | Burtner ............... G06F 3/0482 715/854 |
| 2008/0215978 A1* | 9/2008 | Bamba ............... G06F 3/0482 715/713 |
| 2008/0244454 A1 | 10/2008 | Shibaike |
| 2009/0309849 A1* | 12/2009 | Iwema ............... G06F 3/0488 345/173 |
| 2009/0327963 A1* | 12/2009 | Mouilleseaux ....... G06F 3/0482 715/834 |
| 2009/0327964 A1* | 12/2009 | Mouilleseaux ....... G06F 3/0482 715/834 |
| 2010/0122194 A1* | 5/2010 | Rogers ............... G06F 3/04817 715/769 |
| 2010/0185985 A1* | 7/2010 | Chmielewski ........ G06F 3/0482 715/834 |
| 2010/0197353 A1* | 8/2010 | Marui ............... G06F 3/04886 455/566 |
| 2010/0267449 A1* | 10/2010 | Gagner ............... G07F 17/3211 463/30 |
| 2011/0066981 A1* | 3/2011 | Chmielewski ........ G06F 3/0482 715/834 |
| 2012/0127086 A1* | 5/2012 | Li ............... G06F 3/04812 345/173 |
| 2012/0159339 A1* | 6/2012 | Chiang ............... G06F 3/04842 715/738 |
| 2012/0218305 A1 | 8/2012 | Patterson et al. |
| 2012/0271869 A1* | 10/2012 | Hayakawa ............ G06F 16/168 707/822 |
| 2013/0019182 A1* | 1/2013 | Gil ............... G06F 3/0482 715/738 |
| 2013/0019204 A1 | 1/2013 | Kotler et al. |
| 2013/0019206 A1* | 1/2013 | Kotler ............... G06F 3/04812 715/834 |
| 2013/0067377 A1 | 3/2013 | Rogers |
| 2013/0104079 A1* | 4/2013 | Yasui ............... G06F 3/0482 715/834 |
| 2013/0132904 A1* | 5/2013 | Primiani ............... G06F 3/048 715/834 |
| 2013/0215044 A1* | 8/2013 | Ahn ............... G06F 3/04883 345/173 |
| 2013/0268897 A1* | 10/2013 | Li ............... G06F 3/04886 715/841 |
| 2014/0075388 A1* | 3/2014 | Kuscher ............... G06F 3/0482 715/834 |
| 2014/0092100 A1* | 4/2014 | Chen ............... G06F 3/0482 345/473 |
| 2014/0372858 A1* | 12/2014 | Campbell ............ G06F 17/246 715/220 |

FOREIGN PATENT DOCUMENTS

| | | |
|---|---|---|
| CN | 1790242 A | 6/2006 |
| CN | 102203711 A | 9/2011 |
| EP | 2461244 A1 | 6/2012 |
| JP | 2011-180990 A1 | 9/2011 |
| KR | 10-2007-0043495 A | 4/2007 |
| KR | 2010-0122462 A | 11/2010 |
| KR | 10-2011-0067593 A | 6/2011 |
| RU | 2008141161 A | 4/2010 |
| WO | 97/17650 A1 | 5/1997 |

OTHER PUBLICATIONS

Australian Office Action dated Feb. 8, 2019, issued in Australian Patent Application No. 2013355450.
Chinese Office Action dated Oct. 11, 2019, issued in Chinese Patent Application No. 201310652961.6.
Chinese Office Action dated Apr. 26, 2019, issued in Chinese Patent Application No. 201310652961.6.
Korean Office Action dated May 17, 2019, issued in Korean Patent Application No. 10-2012-0140580.
Indian Examination Report dated Jun. 25, 2020, issued in Indian Application No. 2119/KOLNP/2015.

* cited by examiner

USER TERMINAL APPARATUS AND METHOD OF CONTROLLING THE SAME

CROSS-REFERENCE TO RELATED APPLICATION(S)

This application is a continuation application of prior application Ser. No. 14/073,211, filed on Nov. 6, 2013, which claims the benefit of a Korean patent application filed on Dec. 5, 2012 in the Korean Intellectual Property Office and assigned Ser. No. 10-2012-0140580, the entire disclosure of each of which is hereby incorporated by reference.

TECHNICAL FIELD

The present disclosure relates to apparatuses and methods consistent with various embodiments that relate to a user terminal apparatus and a method of controlling the same. More particularly, the present disclosure relates to a touch-based user terminal apparatus and a method of controlling the same.

BACKGROUND

With the development of electronic technology, various types of user terminal apparatuses have been developed. In particular, user terminal apparatuses, such as Televisions (TVs), Personal Computers (PCs), tablet PCs, portable phones, Motion Picture Expert Group (MPEG) audio layer-3 (MP3) players, and any other similar and/or suitable user terminal apparatuses have been distributed widely and are now used in most homes.

In recent years, in order to meet needs of users who want newer and various functions, touch-based portable terminals such as a tablet PC or a portable phone has supported a document creation module like PC and the like. Therefore, there is a need for a method of providing a related menu in a document creating program provided in a touch-based portable terminal more conveniently.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal apparatus which provides a menu related to a document creation program to a user in an easy operation form in a touch-based portable terminal, and a method of controlling the same.

In accordance with an aspect of the present disclosure, a user terminal apparatus is provided. The user terminal apparatus may include a display configured to provide a screen including an editing object, a user interface unit configured to receive a user operation, and a controller configured to control to display a first wheel navigation User Interface (UI) in a region of the screen when a preset event is generated, the first wheel navigation UI including at least one editing menu related to an attribute of the editing object and being rotatable according to the user operation.

In accordance with another aspect of the present disclosure, a method of controlling a user terminal apparatus is provided. The method may include providing a screen including an editing object, and displaying a first wheel navigation UI in a region of the screen when a preset event is generated, the first wheel navigation UI including at least one editing menu related to an attribute of the editing object and being rotatable according to a user operation.

According to the above-described various embodiments, convenient and intuitive editing UIs is provided to a user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
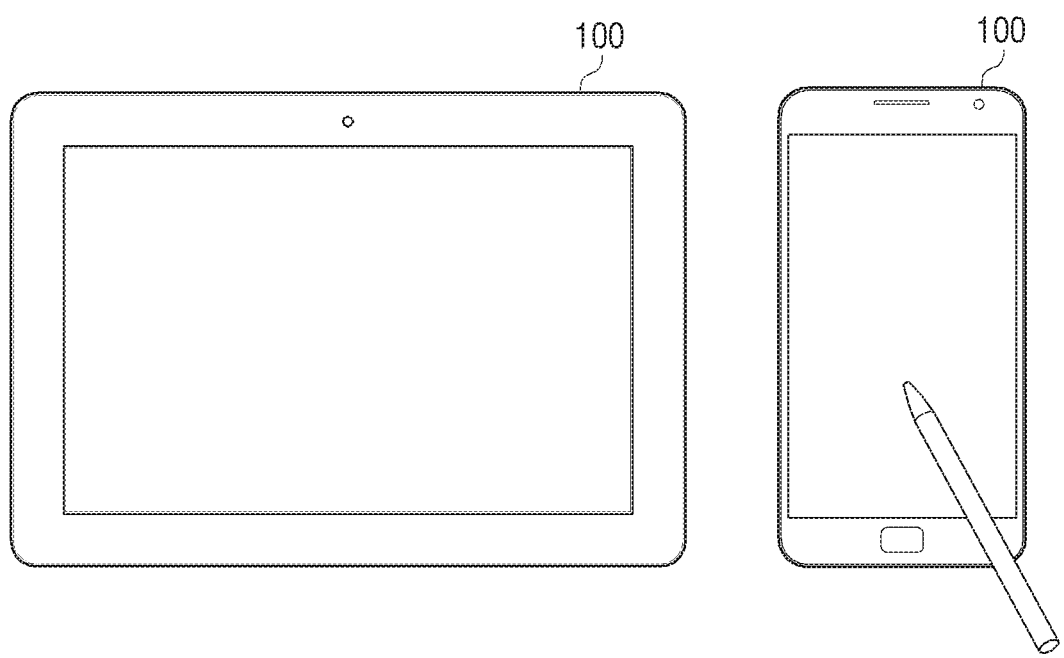
FIGS. 1A and 1B are views illustrating a user terminal apparatus according to an embodiment of the present disclosure.
Figure 1B:
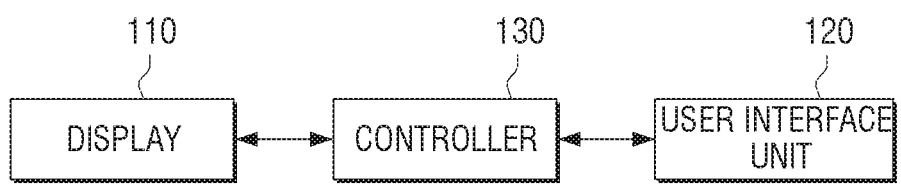

FIGS. 1A and 1B are views explaining a user terminal apparatus according to an embodiment of the present disclosure.

Referring to FIG. 1A, a schematic diagram illustrating an implementation example of a user terminal apparatus according to an embodiment of the present disclosure is shown. As shown in FIG. 1A, a user terminal apparatus 100 may be implemented as various types of portable apparatuses having a display function, such as a tablet (Personal Computer (PC), a portable phone such as a smart phone, a Portable Multimedia Player (PMP), a Personal Digital Assistant (PDA), a navigation system, or any other similar and/or suitable type of apparatus or electronic device. The user terminal apparatus 100 may be implemented with a touch screen included therein to execute a program using a finger or a pen, for example, a stylus pen, a voice command, or any other similar and/or suitable input device.

In particular, a tablet PC, which may be an implementation example of the user terminal apparatus 100 according to an embodiment, is an apparatus in which a portable function of a PDA and a function of a laptop computer, as well as any other similar and/or suitable function, are combined, and may have a function of a desktop computer may access and/or use wireless Internet. The user terminal apparatus 100 may use the touch screen as a main input device, and may use an existing keyboard, mouse, or any other similar and/or suitable input device connected thereto.

The user terminal apparatus 100 may be implemented to execute a preset document creation program and to provide a document creation screen corresponding thereto. For example, the user terminal apparatus 100 may execute a word program, a Hangul program, a Hunminjeongeum program, and the like, to provide the document creation screen of a corresponding program. At this time, the document creation screen may be implemented in an application which is software directly executed using an Operating System (OS) by a user. The application may be represented by an icon interface form on a screen of the user terminal apparatus 100, but the present disclosure is not limited thereto, and the application may be represented in any suitable and/or similar manner.

Referring to FIG. 1B, the user terminal apparatus 100 according to an embodiment includes a display 110, a User Interface (UI) unit 120, and a controller 130.

The display 110 displays a screen. Here, the screen may include an application execution screen, a User Interface (UI) such as a Graphical UI (GUI) screen, and the like including various objects such as an image, a moving image, or text. In particular, the display 110 may display a document creation screen according to an execution of a document creation program. An editing object may be included in the document creation screen according to a user input. Here, the editing object may be various types such text, an image, a table, an equation, or a moving image.

Further, the display 110 may display a tool bar type UI, wherein the tool bar type UI, for convenience of description, may be referred to referred to as a basic editing UI, including a basic editing menu provided in a document creation program on a document creation screen, and a UI that may be referred to as an object editing UI, including an editing menu related to the editing object included in the document creation screen, and the like. The UIs will be described in detail later.

The display 110 may be implemented as a Liquid Crystal Display (LCD), an Organic Light Emitting Diode (OLED) display, and the like, however, the display 110 is not limited thereto and the display 110 may be any similar and/or suitable type of display unit and/or display device. In particular, the display 110 may be implemented as a touch screen type forming a mutual-layered structure with a touch pad. The display 110 may be used as the user interface unit 120 to be described later other than an output device. Here, the touch screen may be configured to detect touch input pressure as well as a touch input location and a touch input area.

The UI unit 120 receives various user commands. In particular, the UI unit 120 may receive various user commands for pop-up-displaying a basic editing UI including a basic editing menu and operating the displayed UI. Here, the UI may be a wheel navigation type rotatable according to a user's operation, and may have a hemispherical shape of which one corner of a screen is a diameter. However, the present disclosure is not limited thereto, and the UI may be any similar and/or suitable type of UI.

The UI unit 120 may receive various commands for pop-up-displaying the object editing UI, including an editing menu related to an editing object included on the document creation screen and operating the displayed UI. Here, the UI may be a circular-shaped or a pie-shaped wheel navigation type rotatable according to a user's operation. However, the present disclosure is not limited thereto, and the navigation wheel may be implemented in any wheel navigation operable shape or any similar and/or suitable shape for the navigation wheel. Various examples of user's various operations with respect to the above-described basic editing UI and the object editing UI will be described in detail later with reference to the accompanying drawings.

The controller 130 functions to control an overall operation of the user terminal apparatus 100.

Method of Displaying Basic Editing UI Including Basic Editing Menu on Screen

The controller 130 may display the basic editing UI, including a basic editing menu provided in a corresponding document creation program, according to a user command. Here, the user command may be a touch operation, or any other similar and/or suitable user input and or user command, for a preset menu icon provided on the program creation screen. For example, the user command may be a touch operation for a "∧"-shaped icon provided in one corner region of the document creation screen, but the icon shape is not limited thereto.

Specifically, the controller 130 may display the basic editing UI including the basic editing menu provided in the document creation program according to the user command. For example, the basic editing menu may include at least one first depth menu, such as a font editing menu, a format editing menu, an object insertion menu, and any other similar and/or suitable first depth menu. The basic editing UI may be a wheel navigation type UI which is rotated and selected by the user's operation which may be a dial type operation, or any other similar and/or suitable user operation. Further, the wheel navigation type UI may be a hemispherical shape disposed in a one corner region of the document creation screen.

When one of the first depth menus is selected according to the user command, the controller 130 may display a second depth menu corresponding to the selected menu in a peripheral region of the hemispherical-shaped UI constituting the first depth menu. For example, when the selected first depth menu is an object insertion menu, the second depth menu may include an insertable object, such as a shape, an image, a character body, a table, or an arrangement.

When one of the second depth menus is selected according to the user command, the controller 130 may display a third depth menu corresponding to the selected menu in a peripheral region of the hemispherical-shaped UI constituting the first depth menu and the second depth menu. For example, when the selected second depth menu is a table menu, the third depth menu may be menu indicating various insertable table types.

When one of a plurality of menus constituting a specific depth menu, such as the first depth menu, the second depth menu, and the third depth menu, is selected by a user's touch operation, the controller 130 may control to rotate a corresponding depth region of a wheel navigation UI and to move the selected menu to a preset location. For example, in a case where a first menu of a plurality of menus constituting the second depth menu is selected according to the user's touch operation, then the controller 130 may control to rotate a second depth menu region and move the selected first menu to a central region of the hemispherical-shaped UI.

When a specific depth menu region is rotated by a user's touch and drag operation and then a specific menu is located to a preset region, the controller 130 may determine that the specific menu is selected. The controller 130 may control to rotate a second depth menu region and move the selected second menu to a central region of the hemispherical-shaped UI The controller 130 may display a lower-leveled menu of a menu item moved to the central region of the hemispherical-shaped UI in a peripheral region of the hemispherical-shaped UI. For example, when one of the second depth menus moves to the central region of the hemispherical-shaped UI by the user's touch operation or the user's touch and drag operation, the controller 130 may extend and display a third depth menu corresponding to the second depth menu in a peripheral region of the second depth menu region.

Method of Displaying Object Editing UI Including Editing Menu Related to Editing Object on Screen The controller 130 may display an object editing UI including at least one editing menu related to an editing object selected in a document creation screen according to a user command. Here, the user command may be a double-tap operation for the editing object, however, the present disclosure is not limited thereto, and the user command may be any suitable and/or similar type of user input. The controller 130 may display a GUI indicating that the editing object is selected. For example, the controller 130 may perform blocking display, highlight display, and the like on the selected editing object.

Specifically, the controller 130 may display a first wheel navigation UI including an editing menu related to an attribute of the selected editing object. For example, when the selected editing object is a shape, the controller 130 may display the first wheel navigation UI including an editing menu of a shape image such as page color, line attribute, or cut. When the selected editing object is text, the controller 130 may display the first wheel navigation UI including an editing menu related to an attribute of the text such as font color, font edit, select all, cut, copy, or delete.

When a specific editing menu is selected on the first wheel navigation UI including an editing menu related to an attribute of the selected editing object, the controller 130 may display a second wheel navigation UI including a lower-leveled menu of the selected editing menu. Here, the second wheel navigation UI may include a return button configured to return to the first wheel navigation including an upper-level menu, and the return button may be disposed in a central region of the second wheel navigation UI. For example, when a "page color" menu is selected on the first wheel navigation UI, the controller 130 may display the second wheel navigation UI including an item indicating various page colors.

When a user's operation, with respect to a preset region on the first wheel navigation UI, is detected, then the controller 130 may extend and display a size of the first wheel navigation UI. When a user's drag operation is detected in a state in which the size of the first wheel navigation UI is extended, then the controller 130 may move a location of the first wheel navigation UI and display the first wheel navigation UI according to the drag operation. For example, the user's operation with respect to the preset region may be a long-tap with respect to the central region of the first wheel navigation UI, however, the present disclosure is not limited thereto, and the user's operation may be any suitable and/or similar type of user input.

In the above-described embodiment, it has been described that the size of the first wheel navigation UI is extended to indicate a state in which a corresponding UI is in a movable state. However, the present disclosure is not limited thereto, and, for example, it may be indicated that a corresponding UI is a movable state by changing a color of the first navigation wheel UI or displaying a separate GUI on the first wheel navigation UI.

When there is a preset touch operation, for example, a click operation, with respect to a screen region after an editing object is copied through a copy menu included on the first wheel navigation UI, the controller 130 may display a paste menu in a preset distance range from a region, in which a cursor is located, on a screen. The screen region to which the preset touch operation is received may be an arbitrary region on the screen. However, the present disclosure is not limited thereto, and the paste menu may be displayed in a preset distance range from a location in which the preset touch operation is detected. Subsequently, when the paste menu is selected, the controller 130 may perform a function to paste the copied editing object to a cursor location. The controller 130 may display a recent job document or other various menus, other than the above-described wheel navigation menus, according to a user command, and description thereof will be made with reference to the accompanying drawings.

Figure 2:
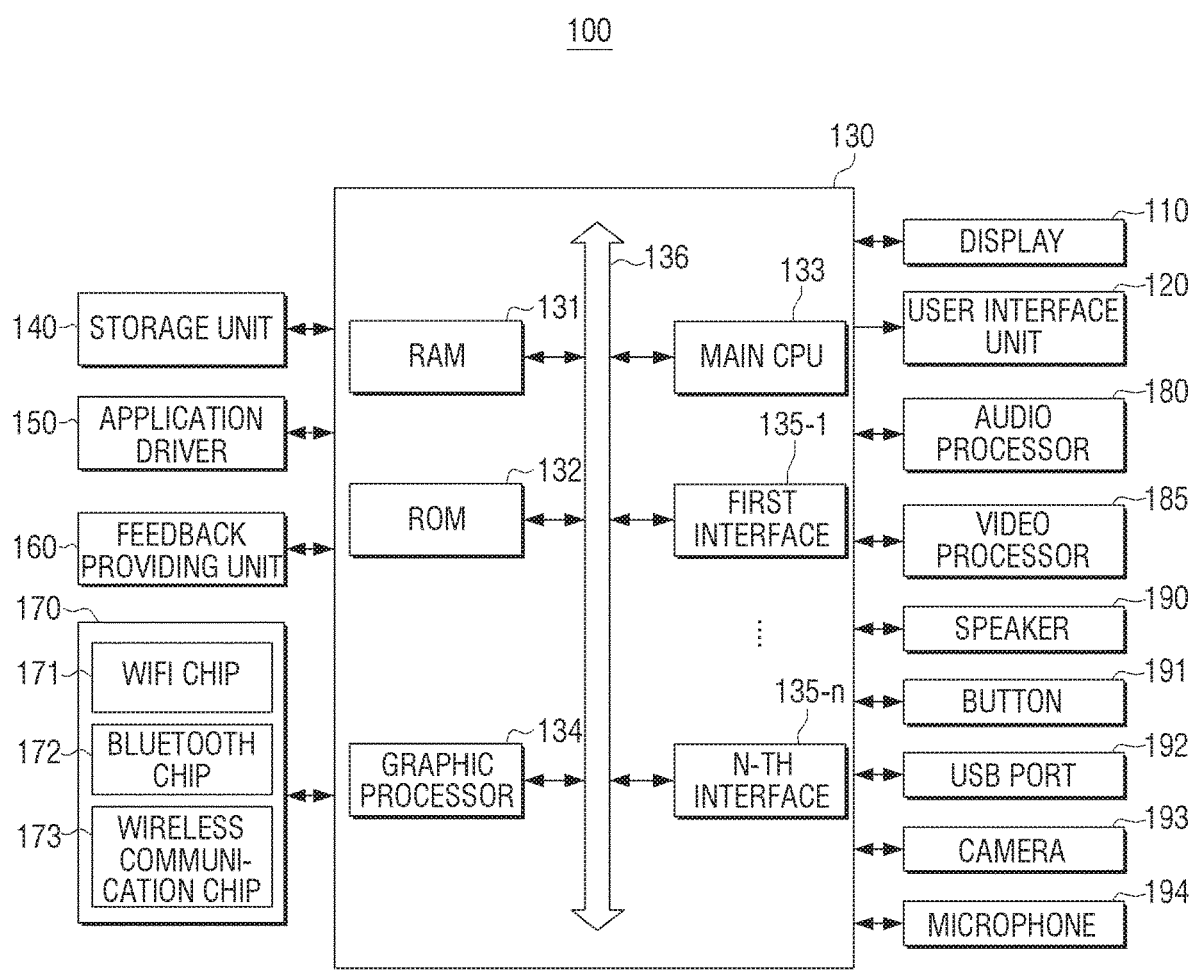
FIG. 2 is a view illustrating a detailed configuration of a user terminal apparatus according to an embodiment of the present disclosure according to an embodiment of the present disclosure.

FIG. 2 is a block diagram illustrating a detailed configuration of a user terminal apparatus according to an embodiment of the present disclosure according to an embodiment of the present disclosure.

Referring to FIG. 2, the user terminal apparatus 100 includes the display 110, the user interface unit 120, the controller 130, a storage unit 140, an application driver 150, a feedback providing unit 160, a communication unit 170, an audio processor 180, a video processor 185, a speaker 190, a button 191, a Universal Serial Bus (USB) port 192, a camera 193, and a microphone 194. Detailed description for portions of components illustrated in FIG. 2 which overlap the components illustrated in FIG. 1 will be omitted.

The operation of the above-described controller 130 may be performed by a program stored in the storage unit 140. The storage unit 140 stores a variety of data, such as an Operating System (OS) software module configured to drive the user terminal apparatus 100, a variety of applications, and a variety of data or content input or set during application execution. The storage unit 140 may store UI data for providing a wheel navigation menu according to various embodiments. Further, the storage unit 140 may store editing menu information corresponding to an attribute of each of editing objects.

In addition, the various software modules stored in the storage unit 140 will be described later with reference to FIG. 3.

The application driver 150 functions to drive and execute an application of the user terminal apparatus 100. Here, the application may be a self-executable application program, and may include a variety of multimedia content. The term 'multimedia content' includes text, audio, a still image, an animation, video, interactive content, Electronic Program Guide (EPG) content from a content provider, an electronic message received from users, information for a current event, and any other similar and/or suitable type of content. For example, the application driver 150 may execute an application for a document creation program according to the embodiment according to a user command.

The feedback providing unit 160 functions to provide a variety of feedback according to a function executed in the user terminal apparatus 100. In particular, the feedback providing unit 160 may provide haptic feedback with respect to a user's operation. Here, the haptic feedback is technology for allowing a user to feel or be notified of a touch by generating a vibration, force, a shock, or some other similar and/or suitable haptic feedback in the user terminal apparatus 100, and may be referred to as computer tactile technology.

Specifically, when a wheel navigation UI is rotated according to a user's operation with respective to the wheel navigation UI, the feedback providing unit 160 may provide haptic feedback corresponding thereto. For example, the feedback providing unit 160 may provide the haptic feedback corresponding to a rotation operation in a basic editing UI rotated in a dial form to provide User experience (UX) emotion like actual dialing.

The feedback providing unit 160 may provide a variety of feedback by applying a vibration condition, for example, a vibration frequency, a vibration length, a vibration strength, a vibration wave, a vibration location, and the like, differently according to control of the controller 130.

In the embodiment, although it has been described that the feedback providing unit 160 provides the haptic feedback using a vibration sensor, the present disclosure is not limited thereto, and the feedback providing unit 160 may provide the haptic feedback using a piezo sensor, or any other similar and/or suitable hardware element for providing haptic feedback.

The communication unit 170 may perform communication with various external apparatuses according to various types of communication methods. The communication unit 170 includes various communication chips, such as a Wireless-Fidelity (Wi-Fi) chip 171, a Bluetooth chip 172, and a wireless communication chip 173. However, the present disclosure is not limited thereto, and the communication unit 170 may include any suitable and/or similar type of communication chips.

The Wi-Fi chip 171 and the Bluetooth chip 172 perform communication in a Wi-Fi manner and a Bluetooth manner, respectively. The wireless communication chip 173 is a chip configured to perform communication according to various communication standards, such as Institute of Electrical and Electronics Engineers (IEEE) standards, Zigbee, 3rd Generation (3G), 3rd Generation Partnership Project (3GPP), Long Term Evolution (LTE), or any other similar and/or suitable type of communication standard. In addition, the communication unit 170 may further include an NFC chip (not shown) configured to operate in an NFC manner using a band of 13.56 MHz among various Radio Frequency IDentification (RF-ID) frequency bands such as 135 kHz, 13.56 MHz, 433 MHz, 860 to 960 MHz, and 2.45 GHz.

The audio processor 180 is configured to perform processing on audio data. The audio processor 180 may variously perform processing on the audio data, such as decoding, amplification, noise filtering, and any other similar and/or suitable audio processing for the audio data.

The video processor 185 is configured to perform processing on video data. The video processor 185 may variously perform image processing on video data, such as decoding, scaling, noise filtering, frame rate conversion, resolution conversion, and any other similar and/or suitable video processing for the video data.

The speaker 190 is configured to output various alarm sounds or voice messages as well as a variety of audio data processed in the audio processor 180.

The button 191 may include various types of buttons, such as a mechanical button, a touch pad, a wheel, or any other type of button, which are provided in arbitrary regions of an external appearance of a main body of the user terminal apparatus 100, such as a front side, a lateral side, or a rear side. For example, a button for power-on/off of the user terminal apparatus 100 may be provided.

The USB port 192 is configured to perform communication with various external apparatuses or to perform charging through a USB cable.

The camera 193 is configured to image a still image or a moving image according to control of the user. In particular, the camera 193 may be implemented with a plural number such as a front camera or a rear camera.

The microphone 194 is configured to receive a user's voice or another sound, and convert the received user's voice or the sound into audio data. The controller 130 may use the user's voice input through the microphone 194 during a call or may convert the user's voice into audio data, and store the audio data in the storage unit 140.

When the camera 193 and the microphone 194 are provided, the controller 130 may perform a control operation according to the user's voice input through the microphone 194 or the user motion recognized by the camera 193. That is, the user terminal apparatus 100 may operate in a motion control mode or a voice control mode. When the user terminal apparatus 100 operates in the motion control mode, the controller 130 activates the camera 193 to image the user, traces change in motion of the user, and performs a control operation corresponding to the motion change. When the user terminal apparatus 100 operates in the voice control mode, the controller 130 analyzes a user's voice input through the microphone, and operates in the voice recognition mode which performs a control operation according to the analyzed user's voice.

In addition, the user terminal apparatus may further include various external input ports (not shown) for connection to various external terminals, such as a headset, a mouse, and a Local Area Network (LAN), or any other similar and/or suitable types of connections to various external elements.

The controller 130 controls an overall operation of the user terminal apparatus 100 using various programs stored in the storage unit 140. For example, the controller 130 may execute the application stored in the storage unit 140 to form an execution screen thereof and display the execution screen, and may reproduce a variety of content stored in the storage unit 140. Further, the controller 130 may perform communication with external apparatuses through the communication unit 170.

Specifically, the controller 130 may include a Random Access Memory (RAM) 131, a Read Only Memory (ROM) 132, a main Central Processing Unit (CPU) 133, a graphic processor 134, first to n-th interfaces 135-1 to 135-n, and a bus 136. The RAM 131, the ROM 132, the main CPU 133, the graphic processor 134, the first to n-th interfaces 135-1 to 135-n, and the like may be electrically coupled to each other through the bus 136. The first to n-th interfaces 135-1 to 135-n are coupled to the above-described components. One of the interfaces may be a network interface coupled to an external apparatus through a network.

The main CPU 133 accesses the storage unit 140 to perform booting using an Operating System (OS) stored in the storage unit 140. The main CPU 133 performs various operations using various programs, content, data, and the like stored in the storage unit 140.

A command set, and the like, for system booting is stored in the ROM 132. When a turn-on command is input to supply power, the main CPU 133 copies the OS stored in the storage unit 140 to the RAM 131 according to a command stored in the ROM 132, and executes the OS to boot a system. When the booting is completed, the main CPU 133 copies various application programs stored in the storage unit 140 to the RAM 131, and executes the application programs copied to the RAM 131 to perform various operations.

The graphic processor 134 generates a screen including various objects such as an icon, an image, text, and the like, using an operation unit (not shown) and a rendering unit (not shown). The operation unit calculates attribute values, such as coordinate values, in which the objects are displayed according to a layout of a screen, shapes, sizes, and colors based on a received control command. The rendering unit generates a screen having various layouts including the objects based on the attribute values calculated in the operation unit. The screen generated in the rendering unit is displayed in a display area of the display 110.

Although not shown in FIG. 2, the user terminal apparatus 100 my further include a sensor. The sensor may detect various operations with respect to the user terminal apparatus 100 such as a touch, rotation, tilt, pressure, or proximity may be sensed. In particular, the sensor may include a touch sensor configured to detect a touch. The touch sensor may be implemented as a capacitive type sensor or a resistive type sensor. The capacitive type sensor is configured to calculate a touch coordinate by sensing a current corresponding to a body of the user when a portion of the body of the user is touched on the surface of the display 110 using a dielectric coated on a surface of the display unit 110. The resistive type sensor is configured to include two electrode plates, and calculate a touch coordinate by sensing current flowing through contact between upper-level and lower-level electrode plates at a touched point when the user touches the screen. As described above, the touch sensor may be implemented in various types. In addition, the sensor may further include a geomagnetic sensor configured to detect a rotation state, a moving direction, and the like, of the user terminal apparatus 100, an acceleration sensor configured to detect a degree of tilt of the user terminal apparatus 100, and the like.

Although FIG. 2 illustrates the example of the detailed configuration included in the user terminal apparatus 100, however, in some various embodiments, portions of the components illustrated in FIG. 2 may be omitted or modified, or other components may be added. For example, the user terminal apparatus 100 may further include a Global Positioning System (GPS) receiver (not shown) configured to receive a GPS signal from a GPS satellite and calculate a current location of the user terminal apparatus 100, and a Digital Multimedia Broadcasting (DMB) receiver (not shown) configured to receive and process a DMB signal.

Figure 3:
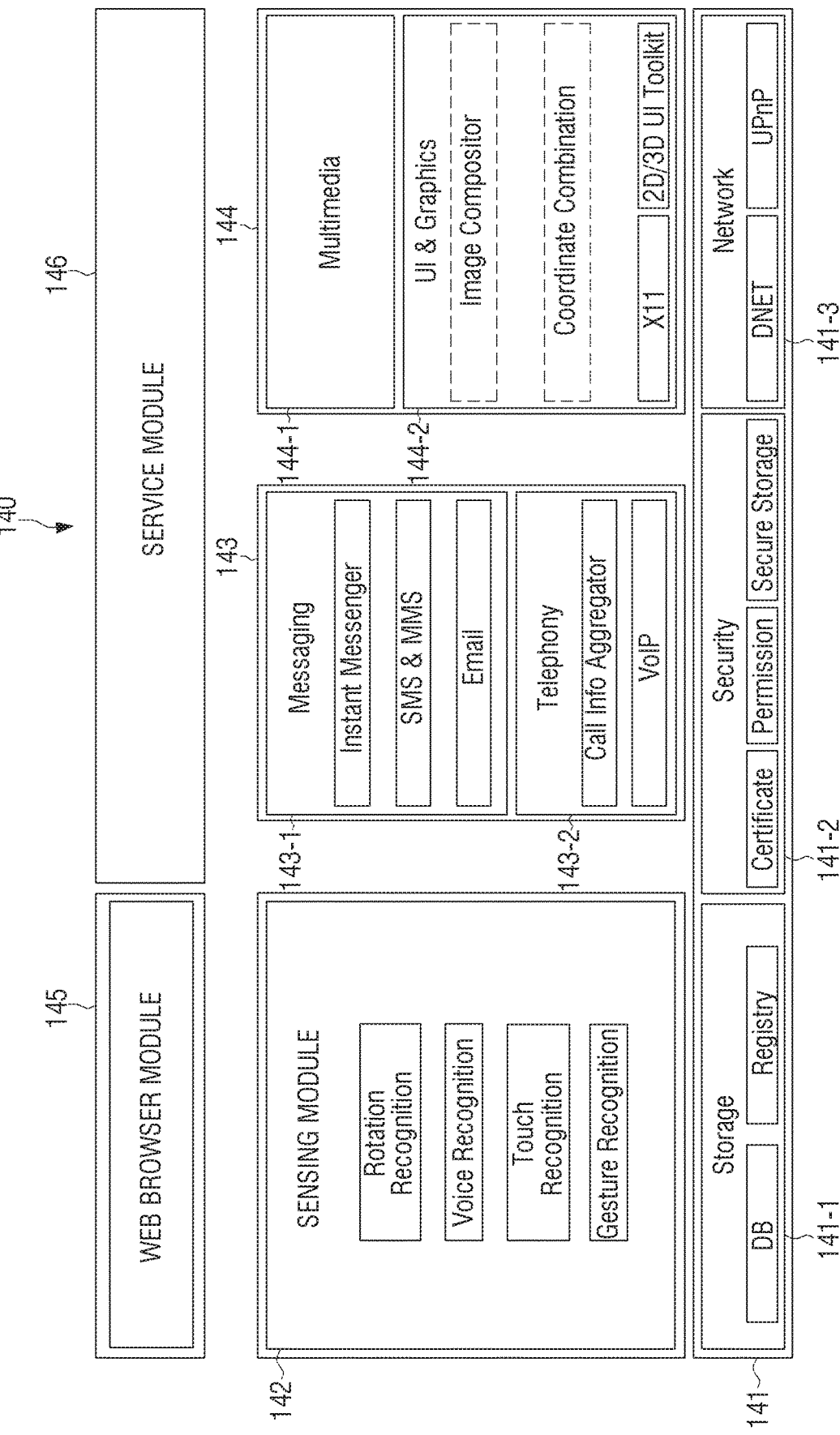
FIG. 3 is a view illustrating a software configuration stored in a storage unit according to an embodiment of the present disclosure.

FIG. 3 is a view illustrating a software configuration stored in a storage unit according to an embodiment of the present disclosure.

Referring to FIG. 3, software including a base module 141, a sensing module 142, a communication module 143, a presentation module 144, a web browser module 145, and a service module 146 may be stored in the storage unit 140.

The base module 141 may be configured to process signals transmitted from hardware included in the user terminal apparatus 100 and transmit the processed signals to an upper layer module. The base module 141 includes a storage module 141-1, a security module 141-2, a network module 141-3, and the like. The storage module 141-1 is a program module configured to manage a database DB or a registry. The main CPU 133 accesses a database in the storage unit 140 using the storage module 141-1 to read a variety of data. The security module 141-2 is a program module configured to support certification to hardware, permission, secure storage, and the like, and the network module 141-3 is a module configured to support network connection, and may include a Device NET (DNET) module, a Universal Plug and Play (UPnP) module, and the like.

The sensing module 142 may be configured to collect information from various sensors, and analyze and manage the collected information. The sensing module 142 may include a head direction recognition module, a face recognition module, a voice recognition module, a motion recognition module, a Near Field Communication (NFC) recognition module, and the like.

The communication module 143 may be configured to perform communication with external devices and/or entities. The communication module 143 may include a messaging module 143-1, such as a messenger program, a Short Message Service (SMS) & Multimedia Message Service (MMS) program, and an E-mail program, and a call module 143-2 including a call information aggregator program module, a Voice over Internet Protocol (VoIP) module, and the like.

The presentation module 144 may be configured to construct a display screen. The presentation module 144 includes a multimedia module 144-1 configured to reproduce and output multimedia content, and a UI rendering module 144-2 configured to perform UI and graphic processing. The multimedia module 144-1 may include a player module, a camcorder module, a sound processing module, and the like. Accordingly, the multimedia module 144-1 operates to reproduce a variety of multimedia content, and to generate a screen and a sound. The UI rendering module 144-2 may include an image compositor module configured to composite images, a coordinate combination module configured to combine and generate coordinates on a screen in which an image is to be displayed, an X11 module configured to receive various events from hardware, and a 2-Dimension (2D)/3-Dimension (3D) UI toolkit configured to provide a tool for forming a 2D type or 3D type UI.

The web browser module 145 may be configured to perform web browsing to access a web server. The web browser module 145 may include various modules, such as a web view module configured to form a web page, a download agent module configured to perform download, a bookmark module, and a web kit module.

The service module 146 is a module including various applications for providing a variety of service. Specifically, the service module 146 may include various program modules, such as a navigation program, a content-reproduction program, a game program, an electronic book program, a calendar program, an alarm management program, and other similar programs.

Various program modules have been illustrated in FIG. 3, but the various program modules may be partially omitted, modified, or other program modules may be added, according to a kind and characteristic of the user terminal apparatus 100. For example, the storage unit may be implemented in a form further including a location-based module (not shown) configured to support location-based service in connection with hardware such as a GPS chip.

Hereinafter, various screen configurations provided according to various embodiments will be described with reference to the accompanying drawings.

Figure 4A:
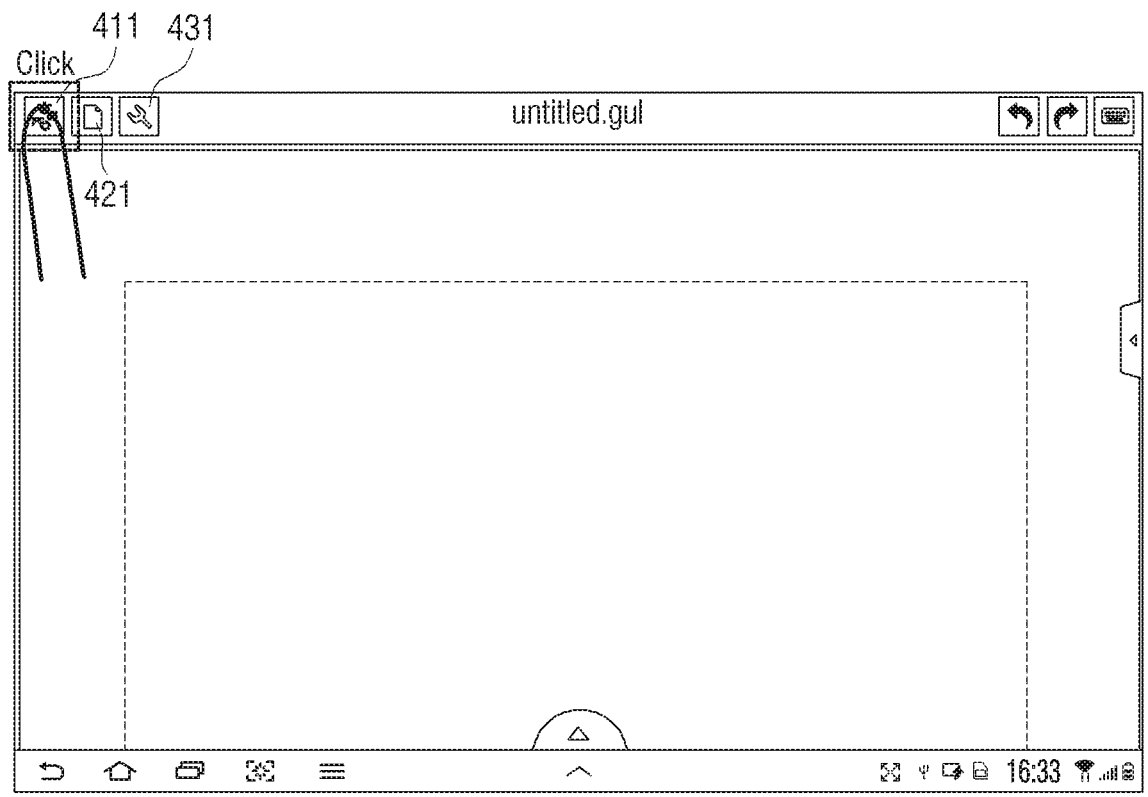
FIGS. 4A, 4B, and 4C are views illustrating configurations of a document creation screen according to an embodiment of the present disclosure.
Figure 4A:
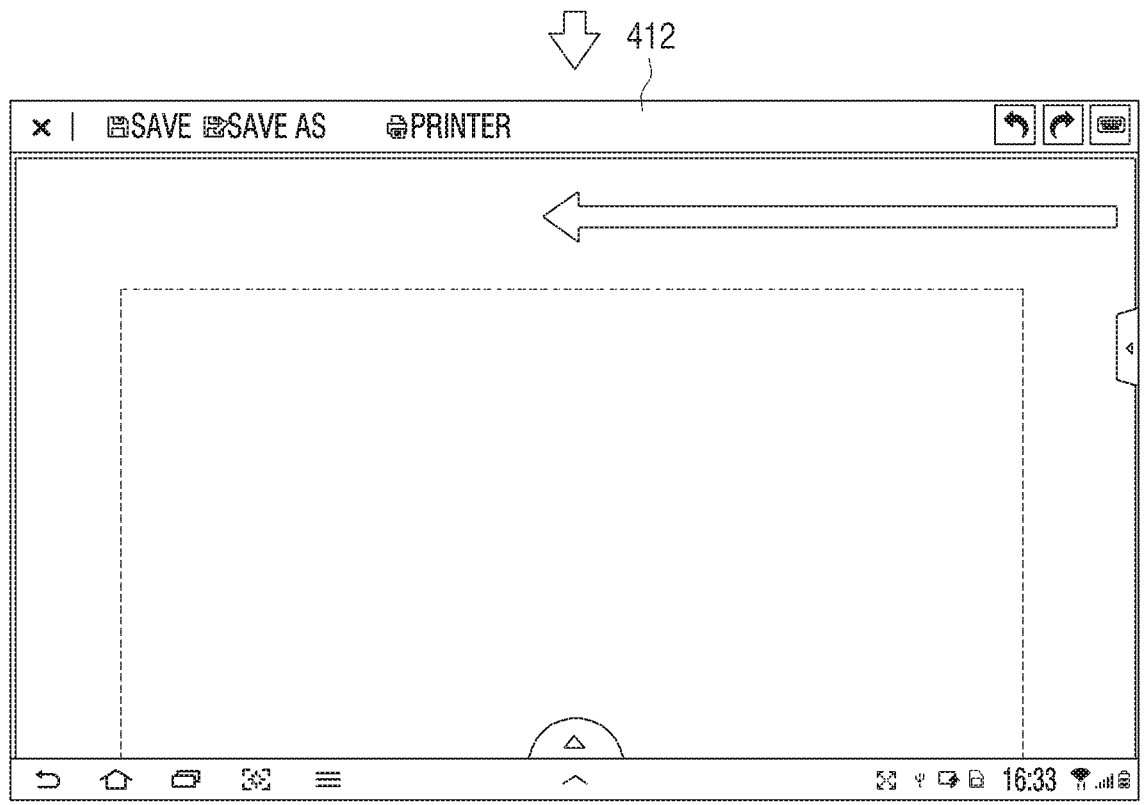
Figure 4B:
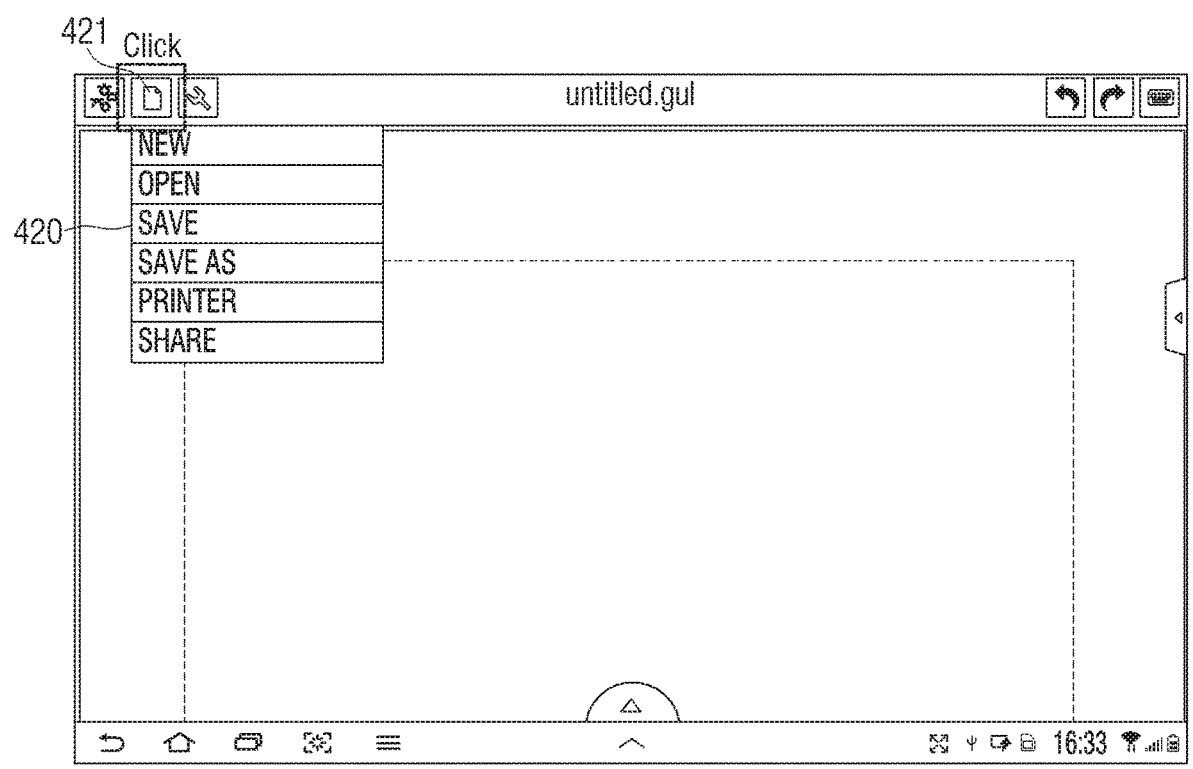
Figure 4C:
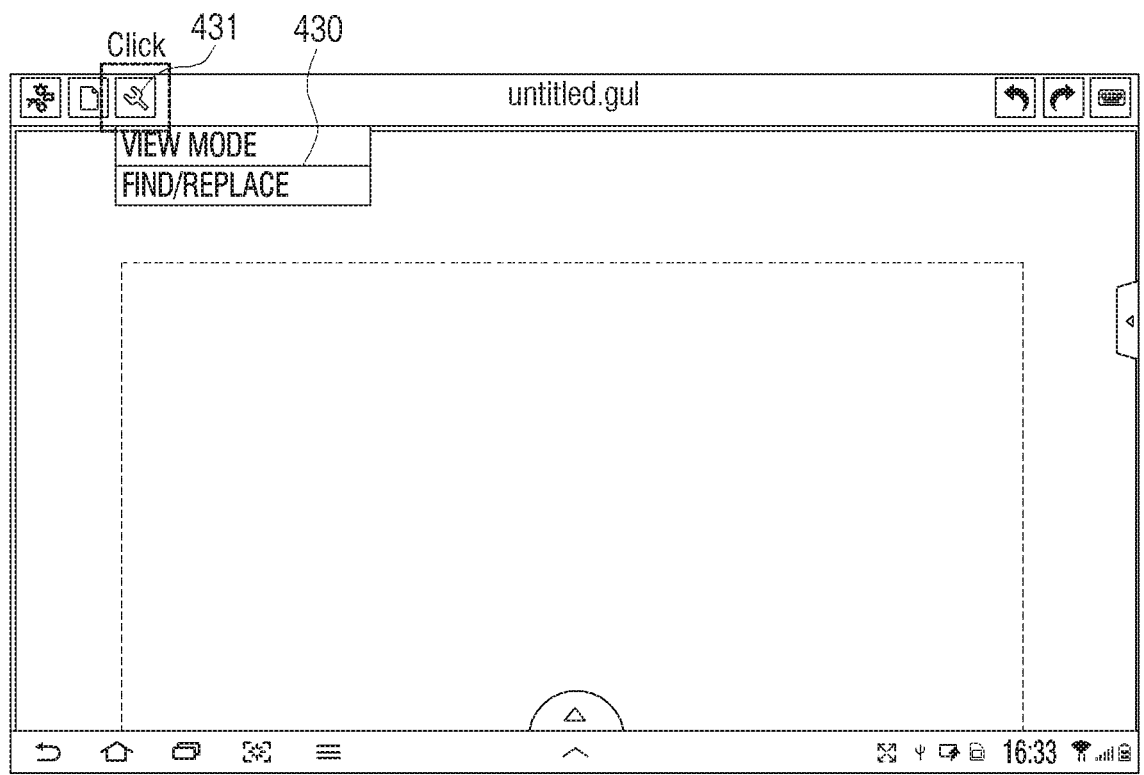

FIGS. 4A, 4B, and 4C are views illustrating configurations of a document creation screen according to an embodiment of the present disclosure.

Referring to FIG. 4A, a type of a document creation screen according to an embodiment of the present disclosure is illustrated.

Referring to FIG. 4A, when a document creation program is executed, a document creation screen corresponding to the document creation program is displayed. Various menu icons may be included in the document creation screen. For example, a first menu icon 411, a second menu icon 421, and a third menu icon 431 may be displayed in an upper left of the document creation screen. That is, a menu other than document editing may be provided through a separate menu icon. When the first menu icon 411 is selected by a user's click operation, a menu bar 412 including a function related to a currently displayed document creation screen may be displayed. The menu bar 412 may be displayed through an animation moving along an arrow direction or may be displayed in any suitable manner.

Referring to FIG. 4B, when the second menu icon 421 is selected by a user's click operation, a menu list 420 including various menu items related to document management such as new, open, store, as store, print, or share may be displayed.

Referring FIG. 4C, when the third menu icon 431 is selected by a user's click operation, a menu list 430 including an additional menu item such as a view mode or find/replace.

Figure 5A:
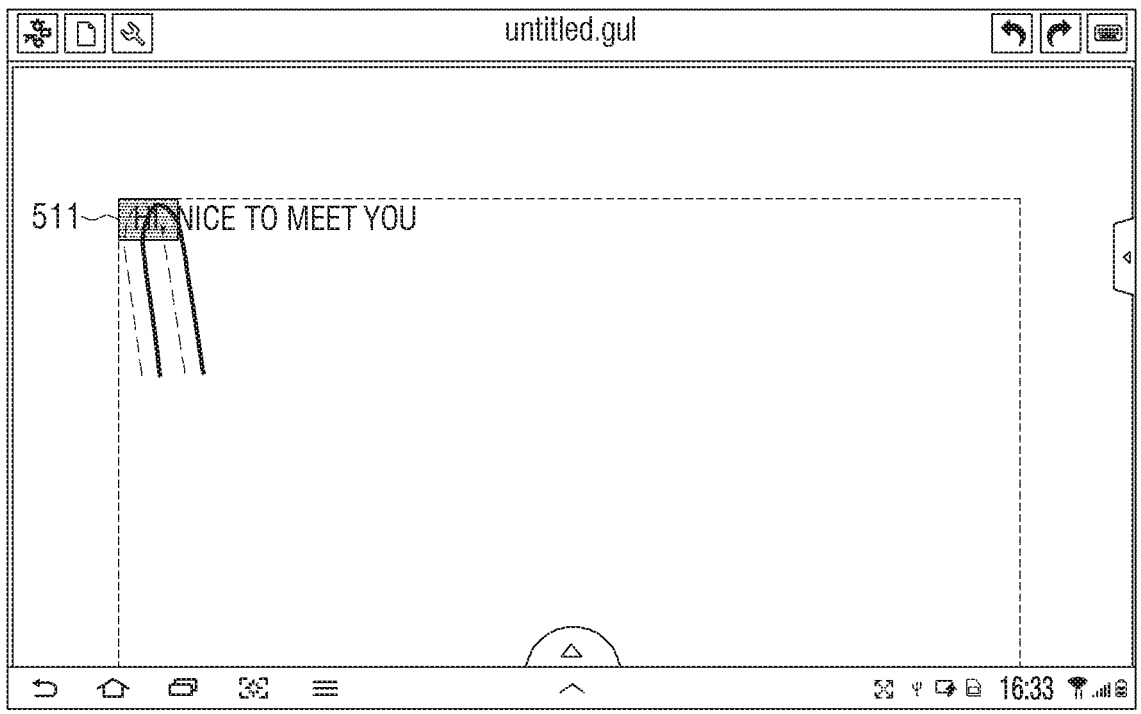
FIGS. 5A, 5B, and 5C are views illustrating methods of providing an object editing menu according to an embodiment of the present disclosure.
Figure 5A:
Figure 5A:
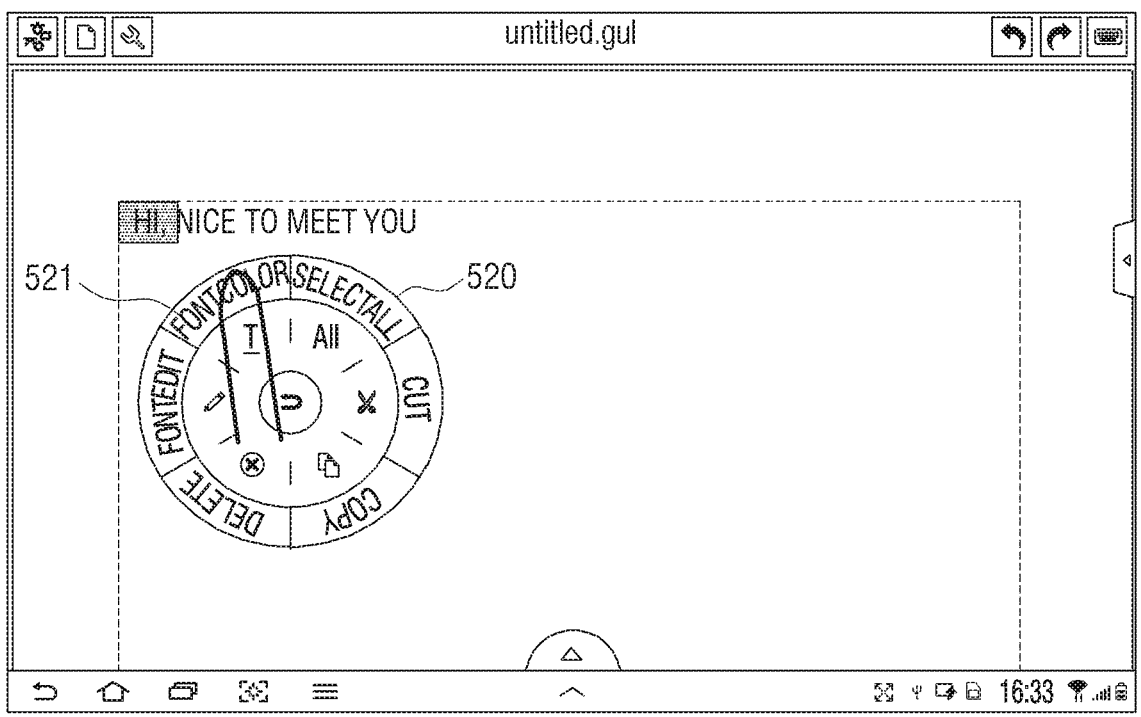
Figure 5B:
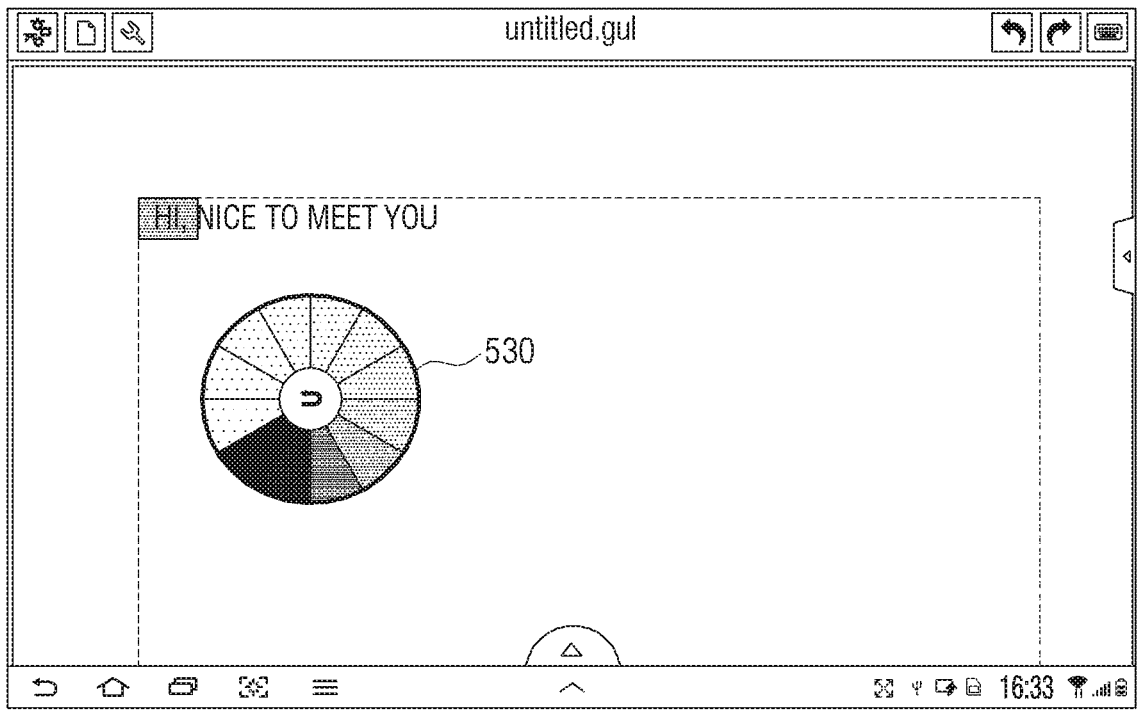
Figure 5C:
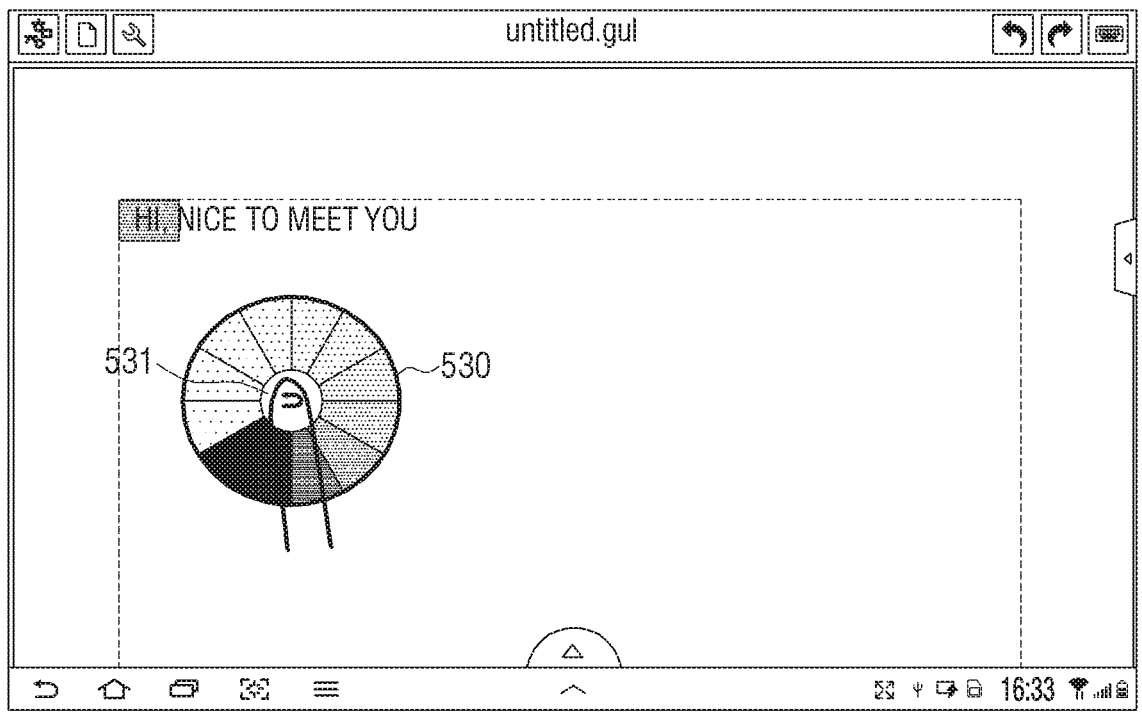
Figure 5C:
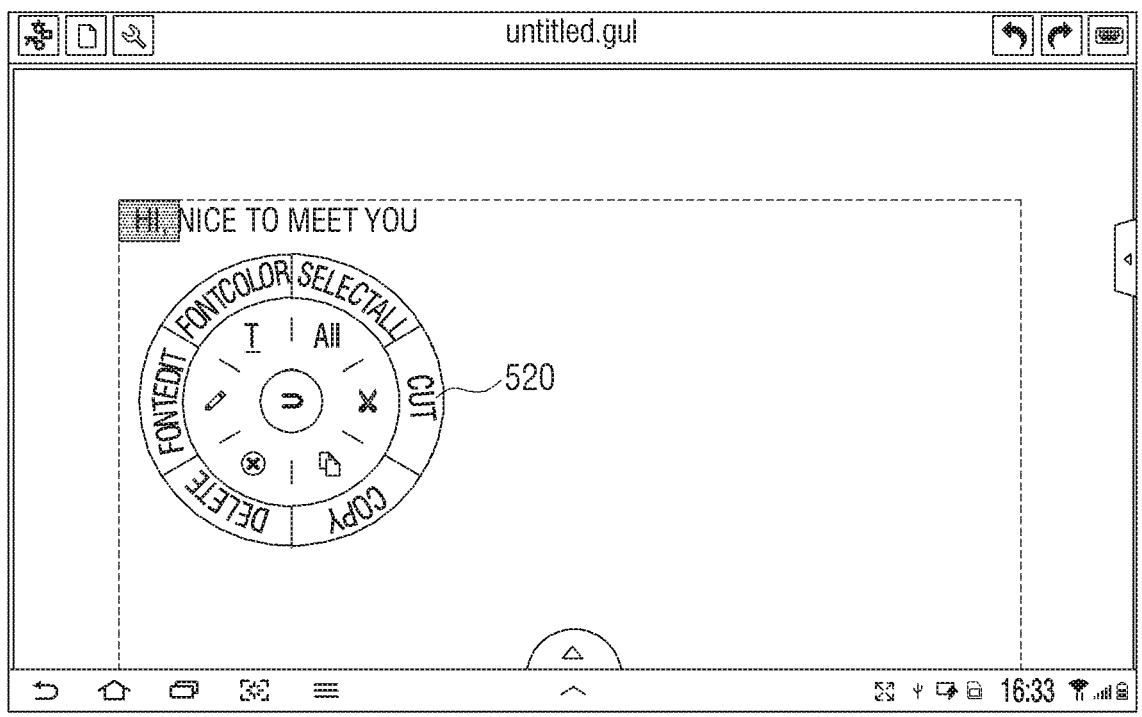

FIGS. 5A, 5B, and 5C are views illustrating methods of providing an object editing menu according to an embodiment of the present disclosure.

Referring to FIG. 5A, when a specific editing object is selected by a user's operation, a wheel navigation UI, including an editing menu corresponding to an attribute of the selected editing object, may be displayed. For example, as illustrated in FIG. 5A, when an editing object 511, having an attribute of text, is selected by a user's double-tap operation, a first wheel navigation UI 520, including editing menus corresponding to an attribute of the selected editing menu 511, such as a font color menu 521, may be displayed on one region of a screen. Here, the menus corresponding to the attribute of the text may be, for example, menus, such as font color, font edition, delete, cut, or select all.

When a specific editing menu is selected on the first wheel navigation UI 520 illustrated in FIG. 5A, as illustrated in FIG. 5B, a second wheel UI 530, including lower-level menus of the selected editing menu, may be displayed. For example, when the font color menu 521 is selected on the first wheel navigation UI 520, then the second wheel navigation UI 530 including various font colors may be displayed. Accordingly, the user may select a desired font color by rotating and selectively operating the second wheel navigation UI 530.

Referring to FIG. 5C, a return button 531, which is for returning to the first wheel navigation UI 520, may be provided on the second wheel navigation UI 530, and when the return button 531 is selected by a user's operation, the first wheel navigation UI 520 may be displayed again.

Figure 6A:
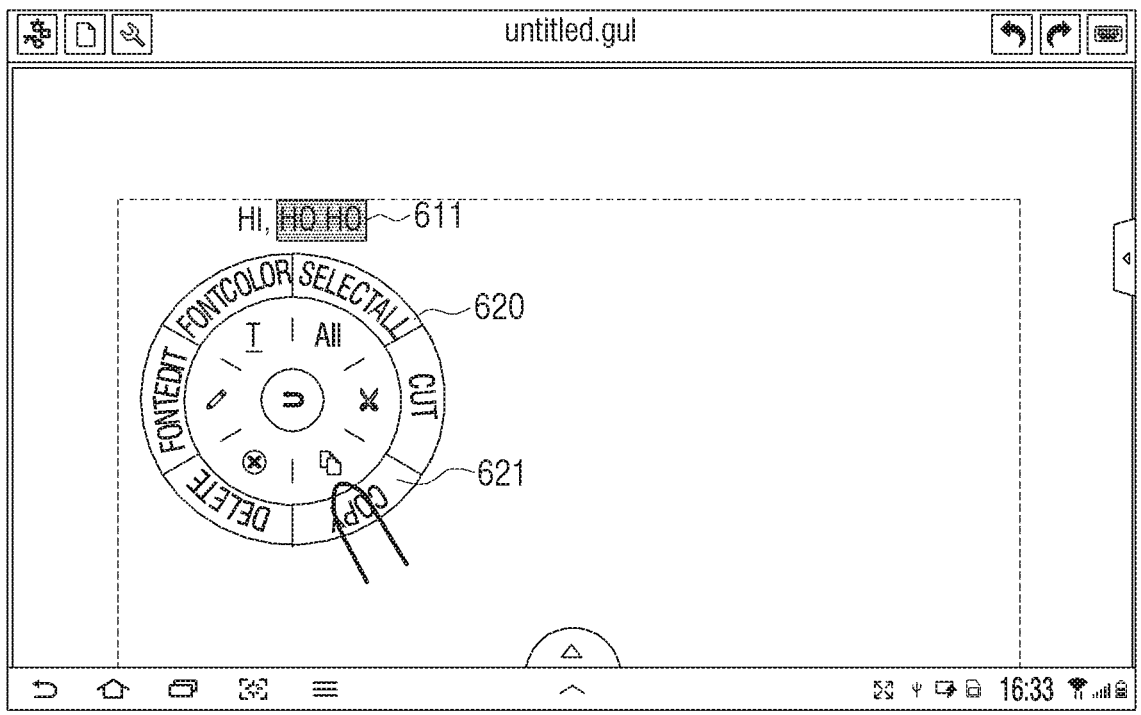
FIGS. 6A and 6B are views illustrating an object editing method according to an embodiment of the present disclosure.
Figure 6A:
Figure 6A:
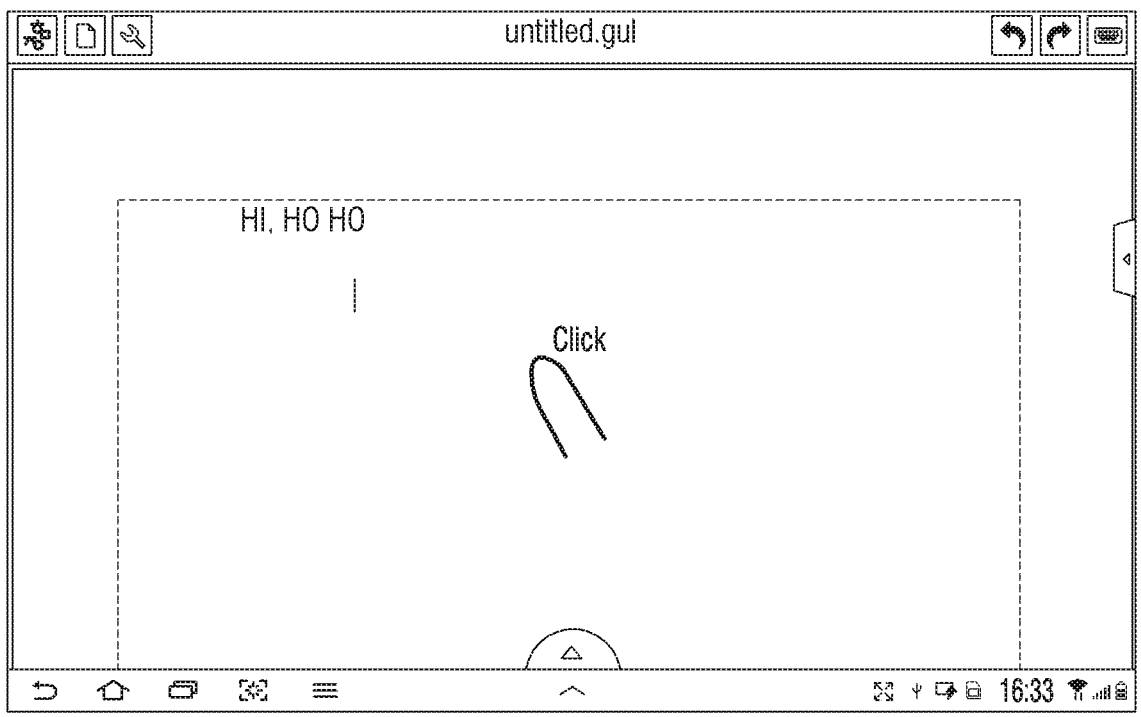
Figure 6B:
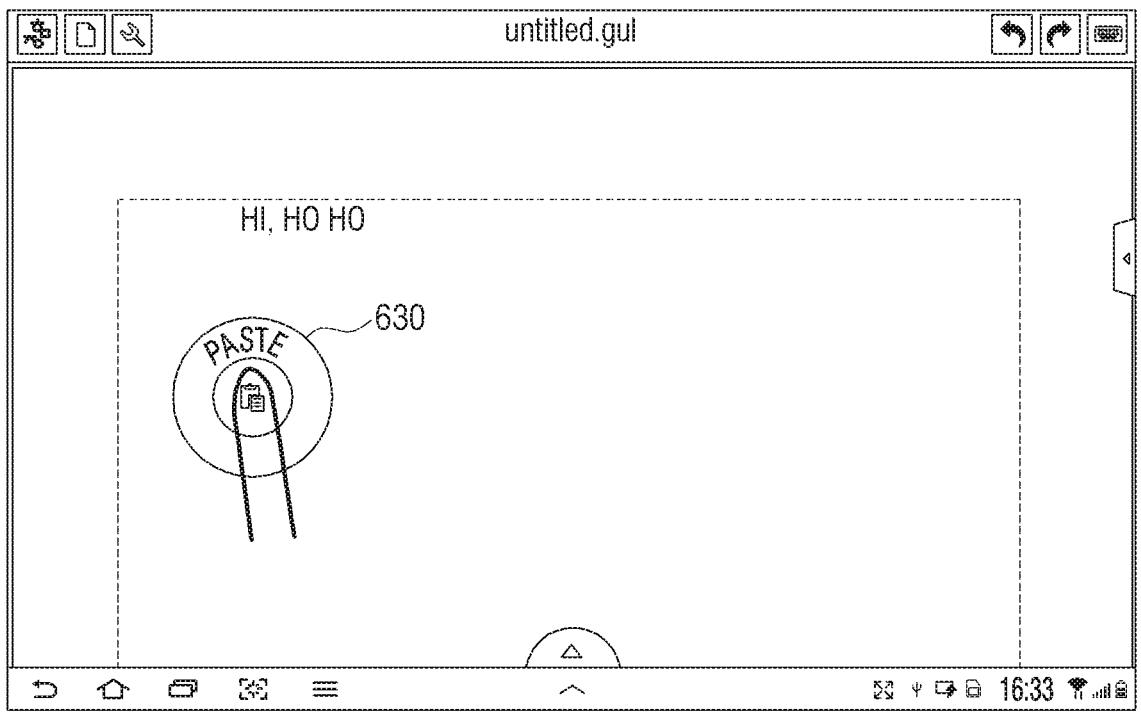
Figure 6B:
Figure 6B:
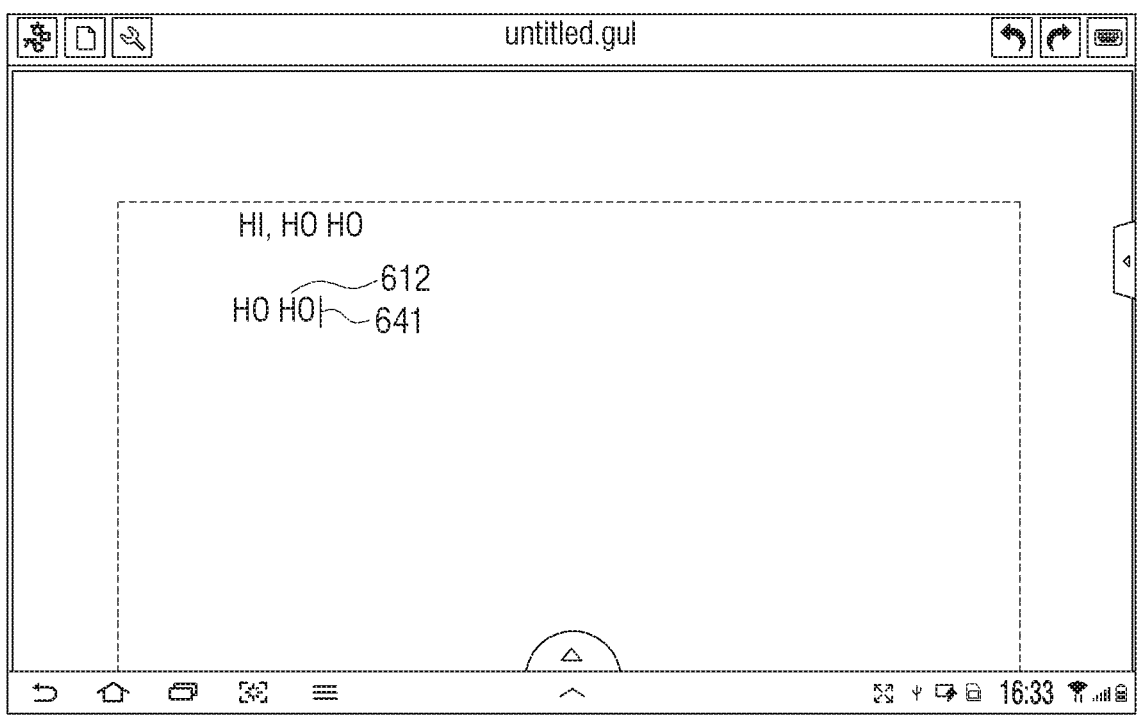

FIGS. 6A and 6B are views illustrating an object editing method according to an embodiment of the present disclosure.

Referring to FIG. 6A, a first wheel navigation UI 620, which includes an editing menu corresponding to an attribute of a specific editing object 611, such as a text attribute of the specific editing object 611, may be displayed. When the copy menu 621 is selected in a state in which a first wheel navigation UI 620 editing is displayed, a copy function with respect to the selected editing object 611 may be performed. Subsequently, when the user performs a click operation on an arbitrary region of a screen, as illustrated in FIG. 6B, a paste menu 630 for performing a paste function with respect to the copied editing object 611 may be displayed. The paste menu 630 may be displayed in a preset distance range from a region in which a cursor 641 is located on the screen. Subsequently, when the paste menu 630 is selected by the user, the copied editing object 611, for example, text "hoho", may be pasted to a pasting location 612 of the cursor 641.

FIGS. 7A, 7B, 7C, and 7D are views illustrating methods of providing an object editing menu according to various embodiments of the present disclosure.

Figure 7A:
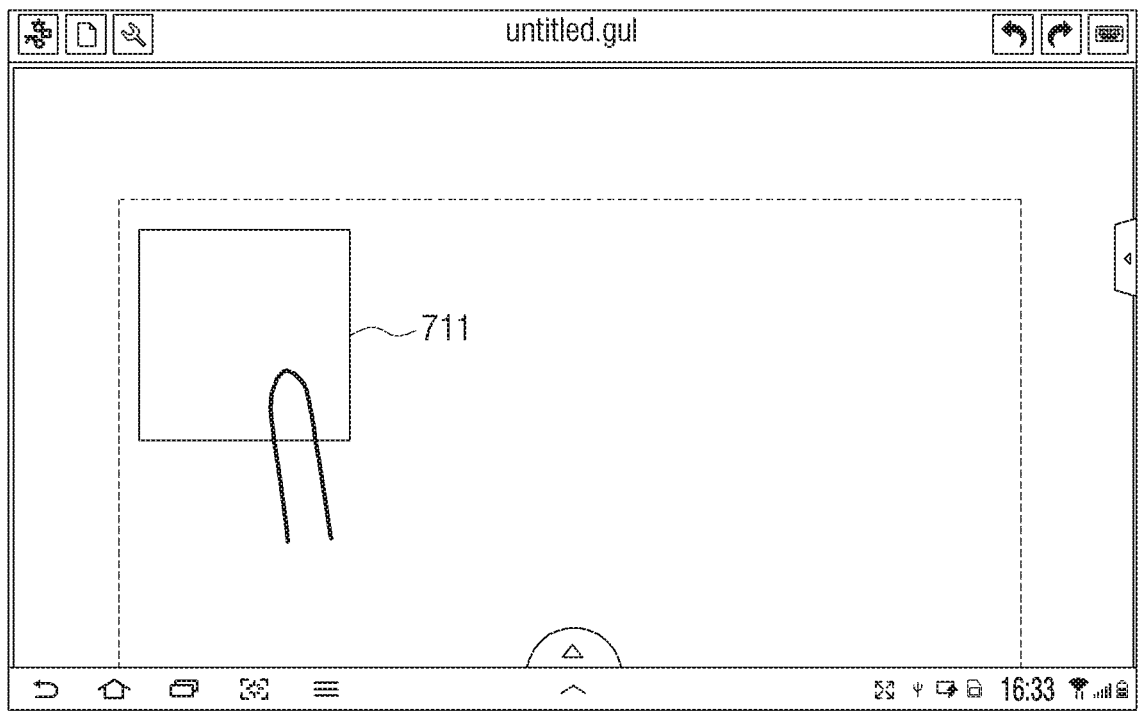
FIGS. 7A, 7B, 7C, and 7D are views illustrating methods of providing an object editing menu according to various embodiments of the present disclosure.
Figure 7A:
Figure 7A:
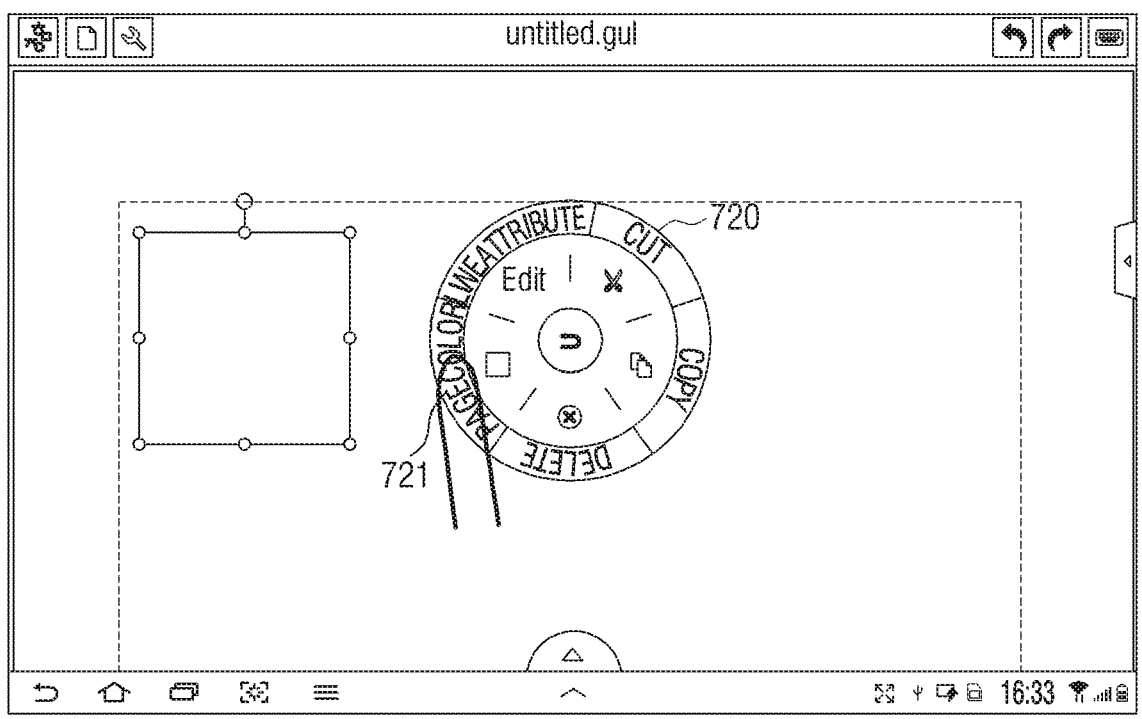

Referring to FIG. 7A, when an editing object 711, having a shape attribute, is selected by a user's operation, then a first wheel navigation UI 720, including an editing menu corresponding to the attribute of the selected editing object 711, may be displayed in a region of a screen. Here, the menus corresponding to the shape attribute may be, for example, menus such as line attribute, page color, delete, copy, and cut.

Figure 7B:
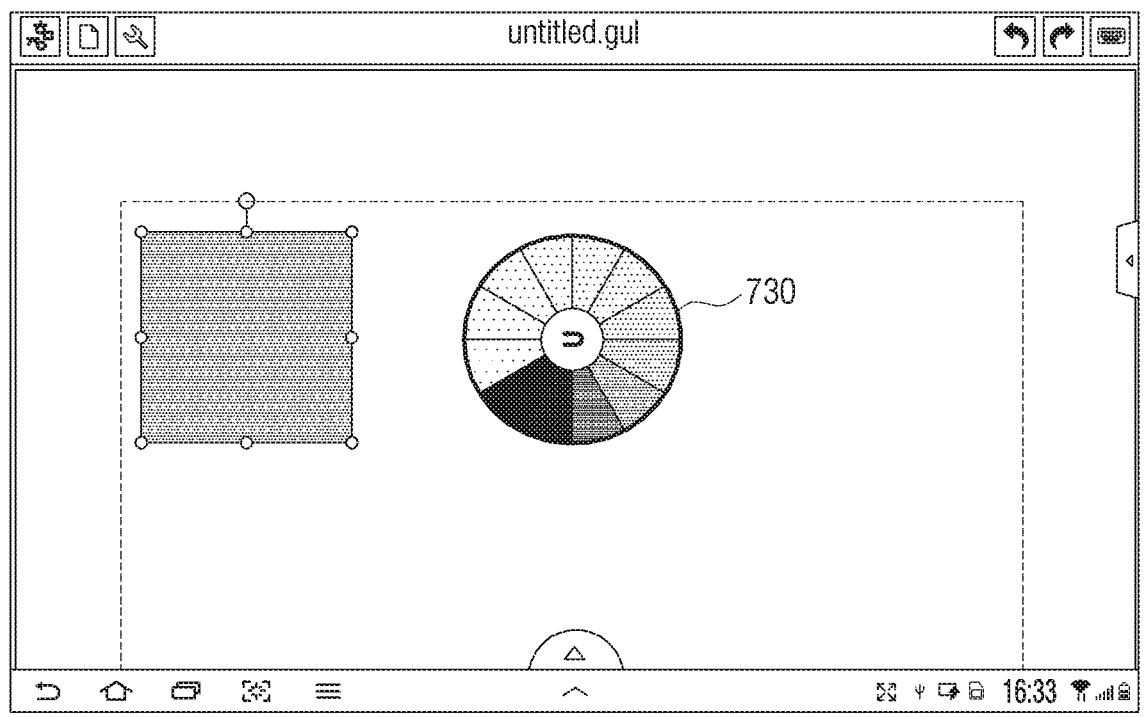

Subsequently, when a page color menu 721 is selected on the first wheel navigation UI 720, as illustrated in FIG. 7A, a second wheel UI 730, including various page colors, may be displayed as illustrated in FIG. 7B. Accordingly, the user may rotate and selectively operate the second wheel navigation UI 730 to select a desired page color.

Figure 7C:
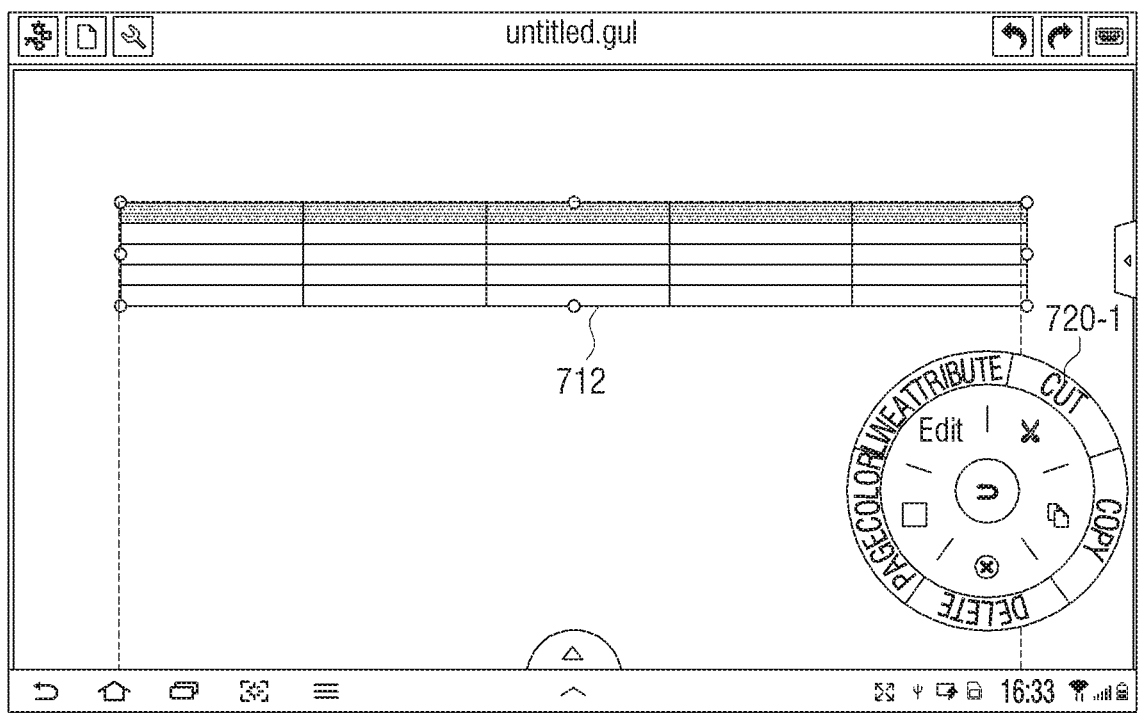

Referring to FIG. 7C, when an editing object 712 having a table attribute is selected, then a first wheel navigation UI 720-1, including editing menus corresponding to the table attribute, may be displayed. Here, the editing menus corresponding to the table attribute may be menus such as line attribute, page color, delete, copy, and cut.

Figure 7D:
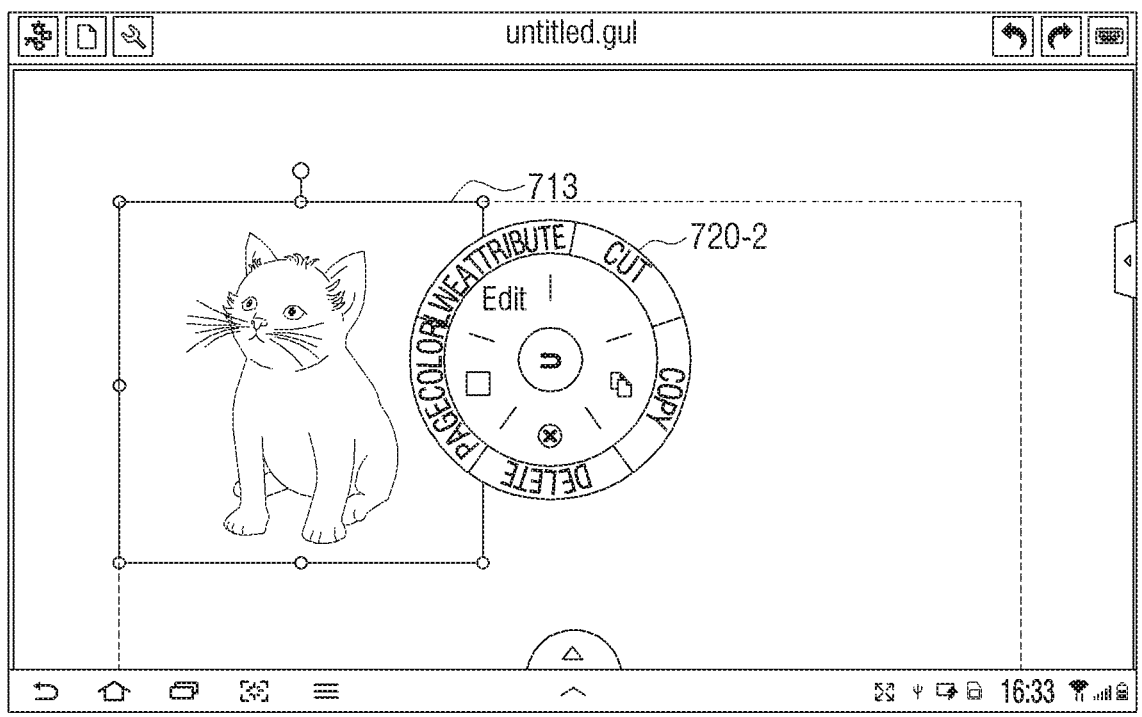

Referring to FIG. 7D, when an editing object 713 having an image attribute is selected, then a first wheel navigation 720-2, including editing menus corresponding to the image attribute, may be displayed. Here, the editing menus corresponding to the image attribute may be menus such as line attribute, page color, image crop, delete, copy, and cut.

Figure 8A:
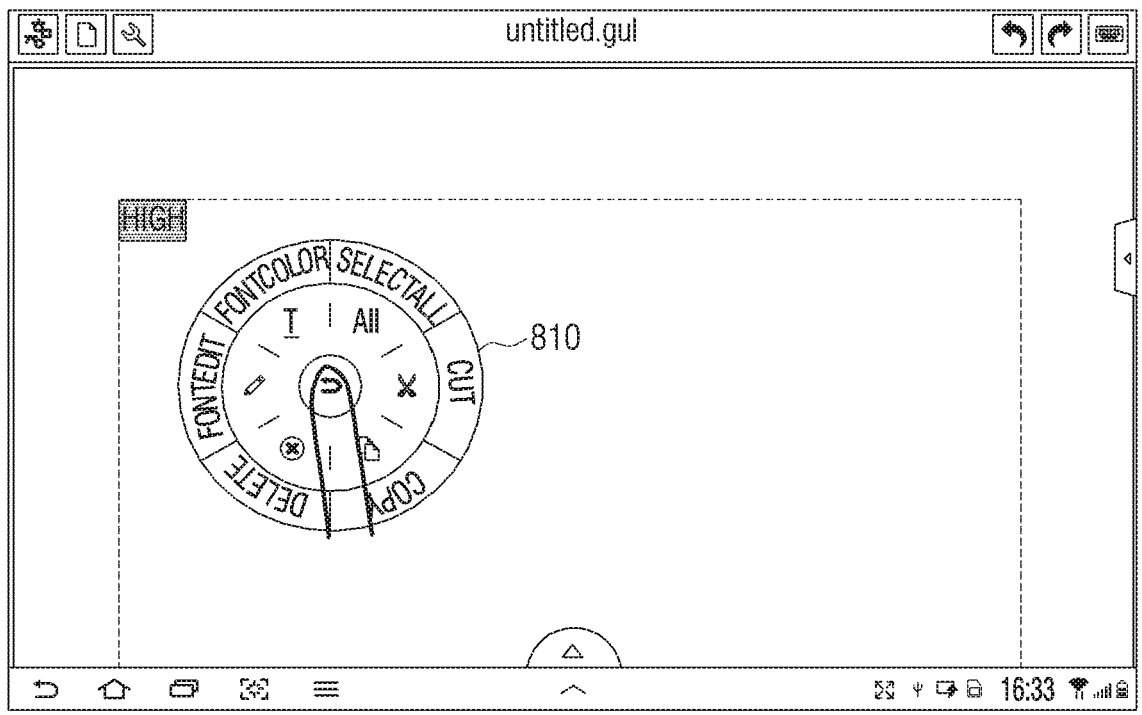
FIGS. 8A and 8B are views illustrating a method of moving a wheel navigation UI according to an embodiment of the present disclosure.
Figure 8A:
Figure 8A:
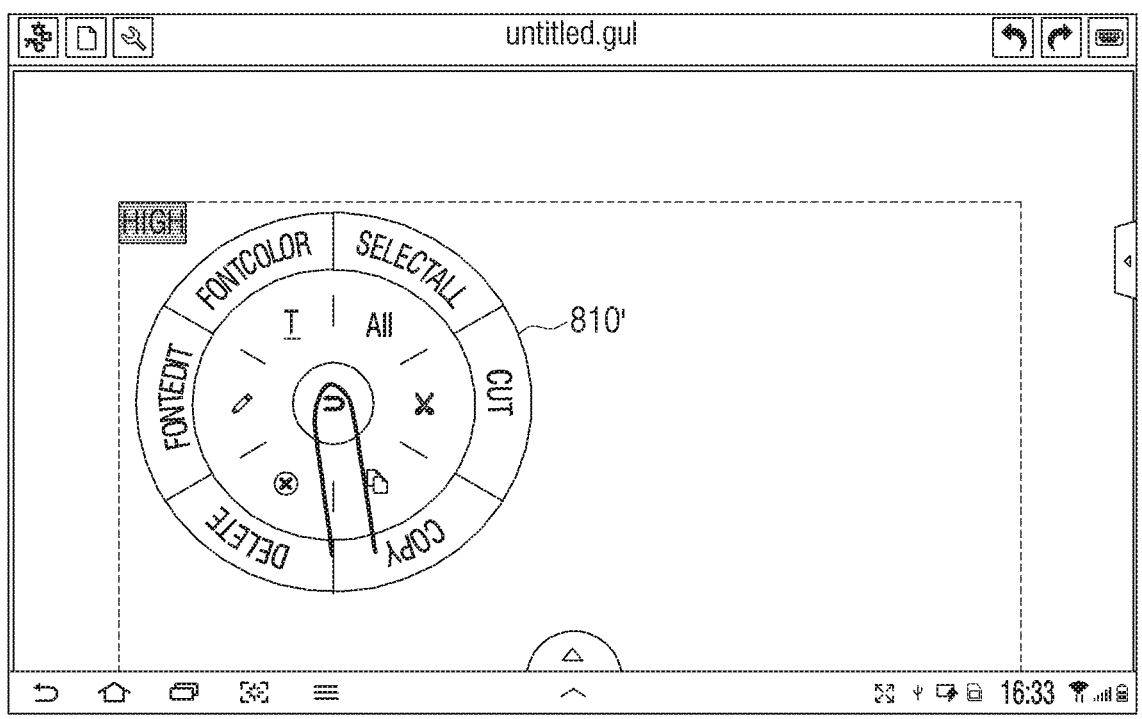
Figure 8B:
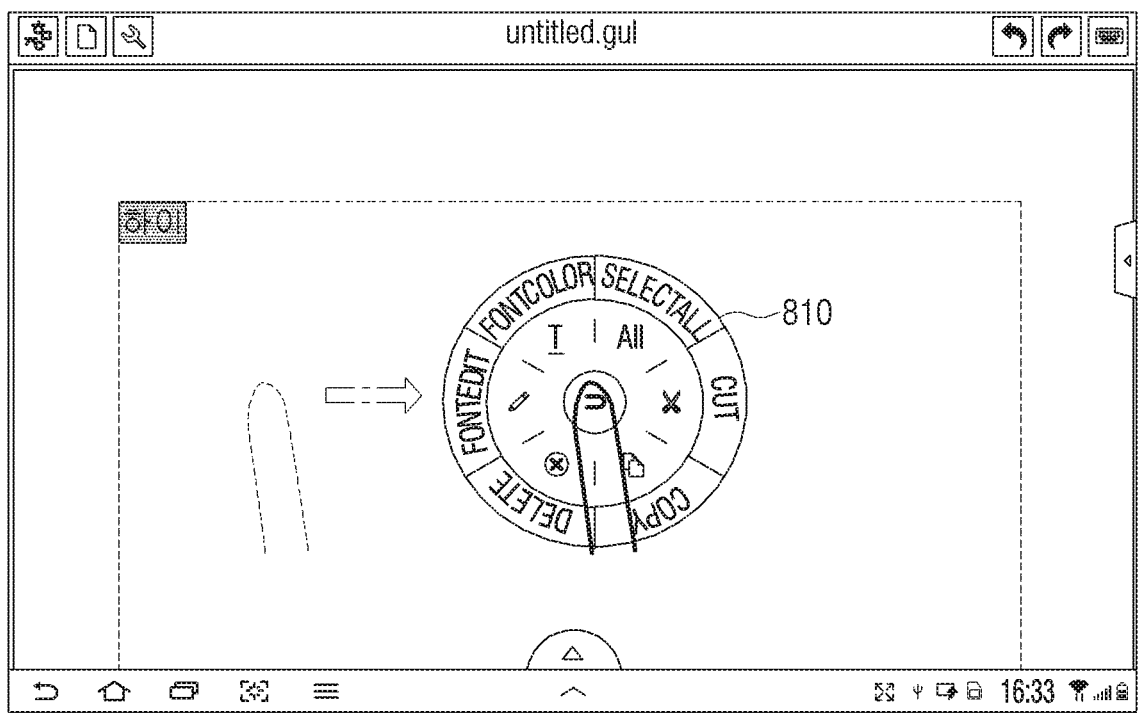

FIGS. 8A and 8B are views illustrating a method of moving a wheel navigation UI according to an embodiment of the present disclosure.

Referring to FIGS. 8A and 8B, a specific editing object may be selected, and a display location of a wheel navigation UI 810 may move according to a user's operation with respect to a preset region of the wheel navigation UI 810 in a state in which the wheel navigation UI 810 corresponding to the specific editing object is displayed.

For example, as illustrated in FIG. 8A, when a long touch operation is performed on a central region of the wheel navigation UI 810 in a state in which the wheel navigation UI 810, including an editing menu corresponding to the selected editing object, is displayed, then the wheel navigation UI 810 may be displayed in a form to indicate that the wheel navigation UI 810 is in a movable state. For example, a wheel navigation UI 810 may be displayed in an extended form as the extended wheel navigation UI 810'. However, the present disclosure is not limited thereto, and the wheel navigation UI may be implemented to indicate the movable state in another GUI form, such as a highlight display.

Subsequently, as illustrated in FIG. 8B, when a user's operation for a drag movement or gesture, in a state in which the extended wheel navigation UI 810' of FIG. 8A is the movable state, is input, then the extended wheel navigation wheel UI 810' may be moved and then be displayed. When the moving of the wheel navigation UI 810' is completed, the extended wheel navigation UI 810' displayed in the extended form may return to an original state, and the wheel navigation UI 810 may be displayed.

FIGS. 9A, 9B, 9C, 9D, and 9E are views illustrating methods of providing a basic editing menu including a basic editing menu according to an embodiment of the present disclosure.

Figure 9A:
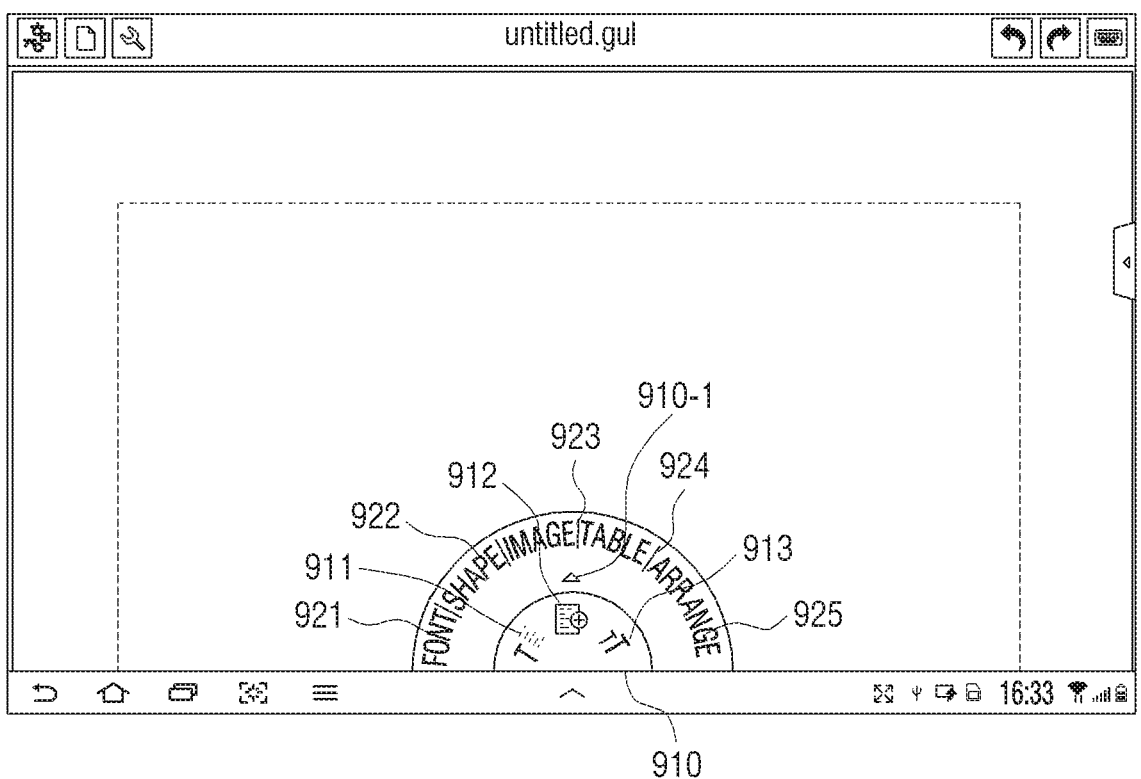
FIGS. 9A, 9B, 9C, 9D, and 9E are views illustrating methods of providing a basic editing menu including a basic editing menu according to an embodiment of the present disclosure.

Referring to FIG. 9A, a tool bar-shaped basic editing UI, for providing a basic editing menu provided in a document creation screen, may include three categories, that is, a format category 911, an insertion category 912, and a font category 912, and the three category menus 911 to 913 may be displayed in a hemispherical-shaped first region.

Referring to FIG. 9A, when a menu corresponding to the insertion category 912 is located in the center of the hemispherical-shaped UI, lower-leveled menus 921 to 925, included in the insertion category 912, may be extended to and displayed in a second region which is a peripheral region surrounding a first region. An icon 910-1, indicating that a central region of the second region is a reference region for selection, may be displayed in the central region of the second region. That is, when a specific menu is arranged in a region in which the icon 910-1 is displayed according to a user's operation, then the specific menu may be determined to be selected.

Figure 9B:
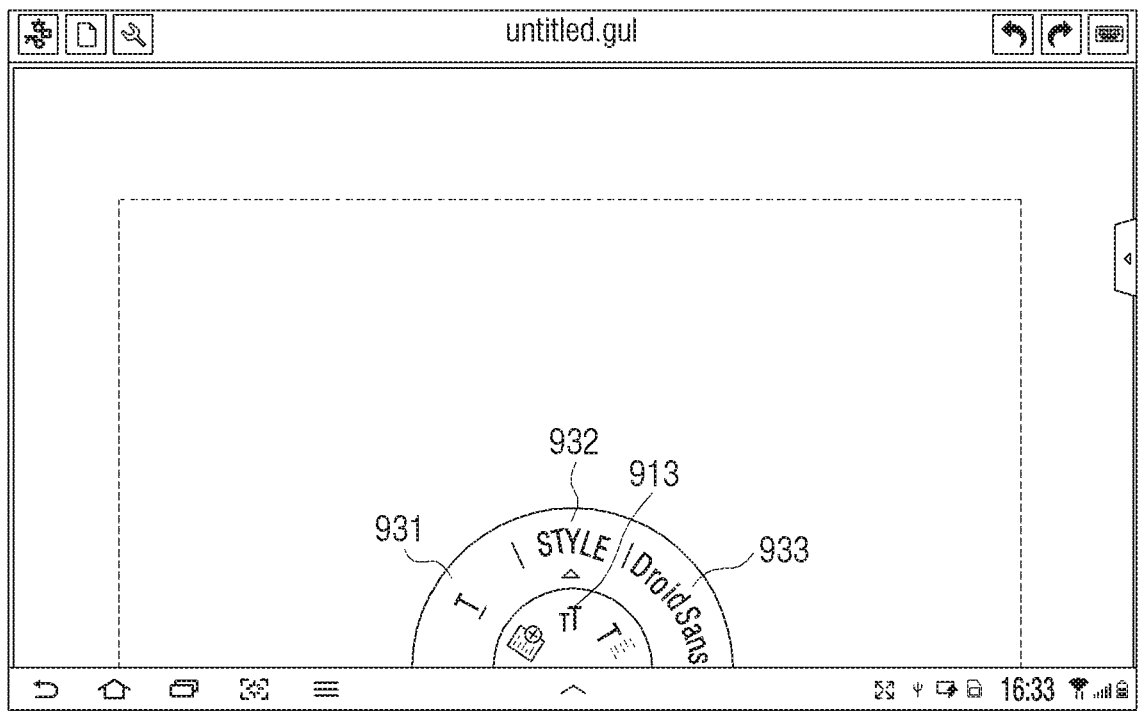

Referring to FIG. 9B, when a menu corresponding to the font category 913 is located in the center of the hemispherical UI, then lower-level menus 931 to 933 included in the font category 913 may be extended to and displayed in a second region, which is a peripheral region surrounding a first region.

Figure 9C:
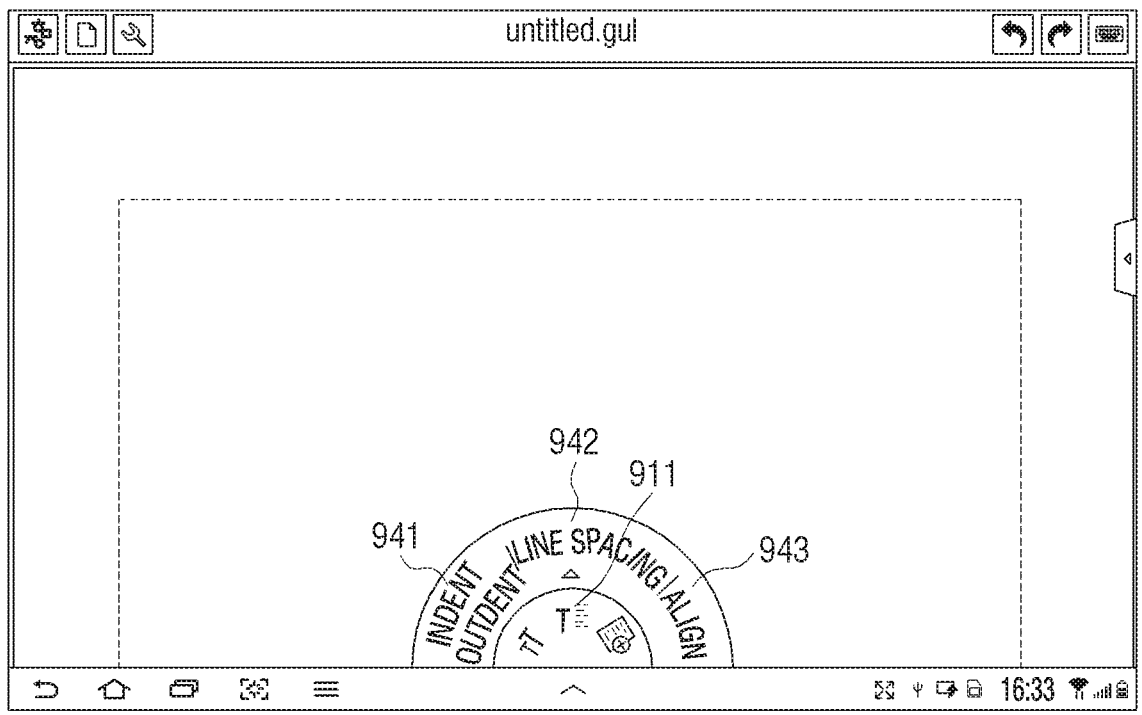

Referring to FIG. 9C, when a menu corresponding to the format category 911 is located in the center of the hemispherical-shaped UI, then lower-level menus 941 to 943 included in the format category 911 may be extended to and displayed in a second region, which is a peripheral region surrounding a first region.

Figure 9D:
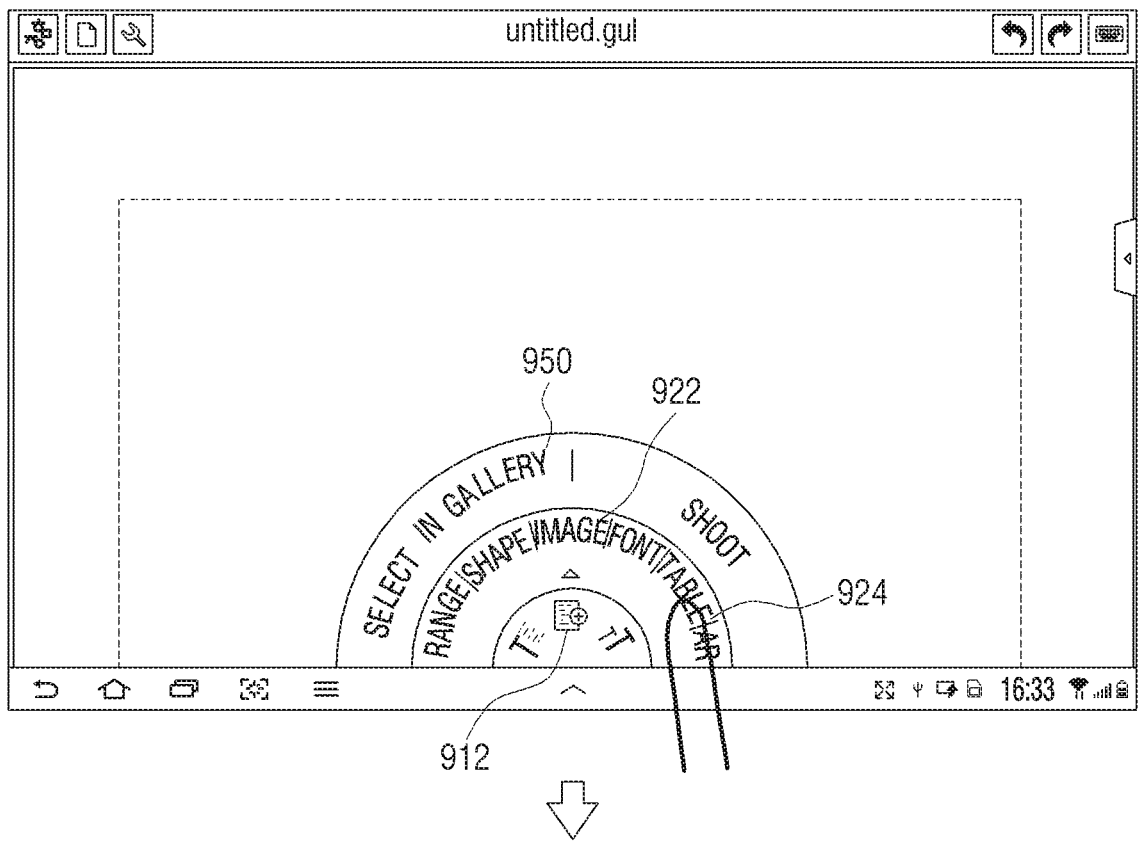
Figure 9D:
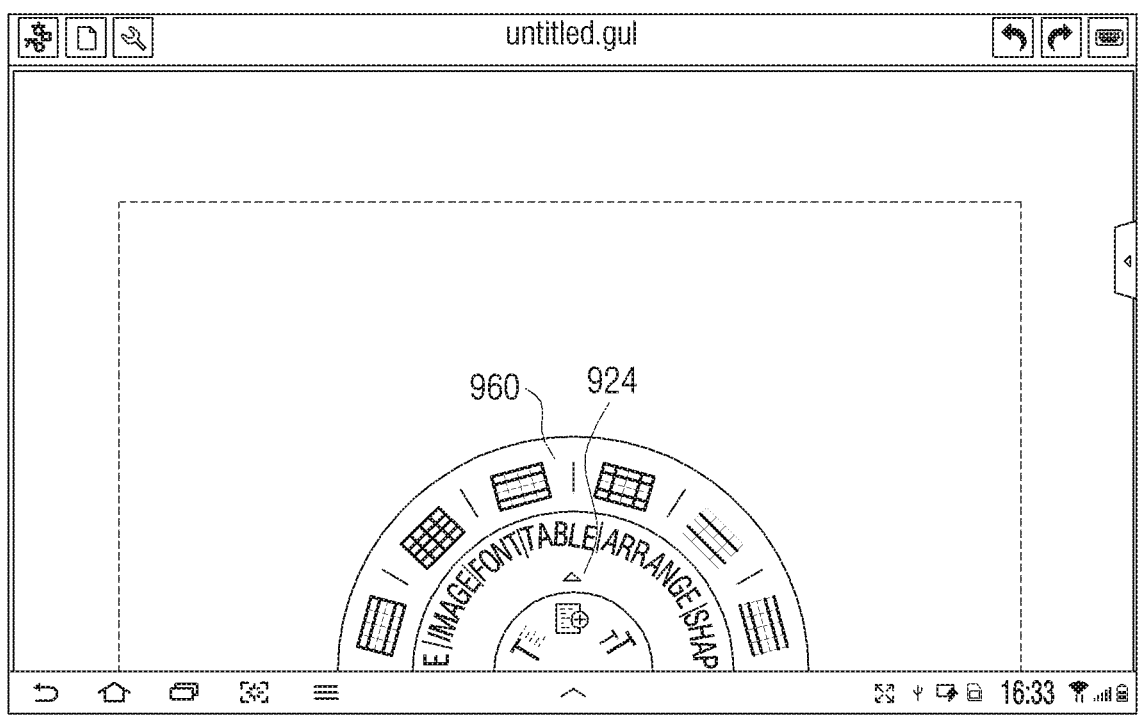

Referring to FIG. 9D, when one of the lower-level menus, such as an image item 922, is selected from among the lower-level menus in a state in which the lower-level menus included in the insertion category 912 are displayed in the second region, then lower-level menus included in the image item 922 may be displayed on a third region 950. For example, as illustrated in FIG. 9D, "select in gallery" and "shoot" items, as the lower-level menus included in the image item 922, may be displayed in the third region 950.

When a table item 924 is selected from among the lower-level menus, in a state in which the lower-leveled menus included in the insertion category 912 are displayed in the second region, then the second region constituting the hemispherical-shaped UI is rotated, and the table item 924 may move to and be displayed in a central region of the hemispherical-shaped UI. Here, the selection of the table item 924 may be performed by a user's click operation with respect to a region of the table item 924.

When the table item 924 moves to and is displayed in the central region of the hemispherical-shaped UI, the lower-level menus included in the table item 924 may be displayed on a third region 960. For example, as illustrated in FIG. 9D, items, indicating various table types as the lower-level menus included in the table item 924, may be displayed in the third region 960.

Figure 9E:
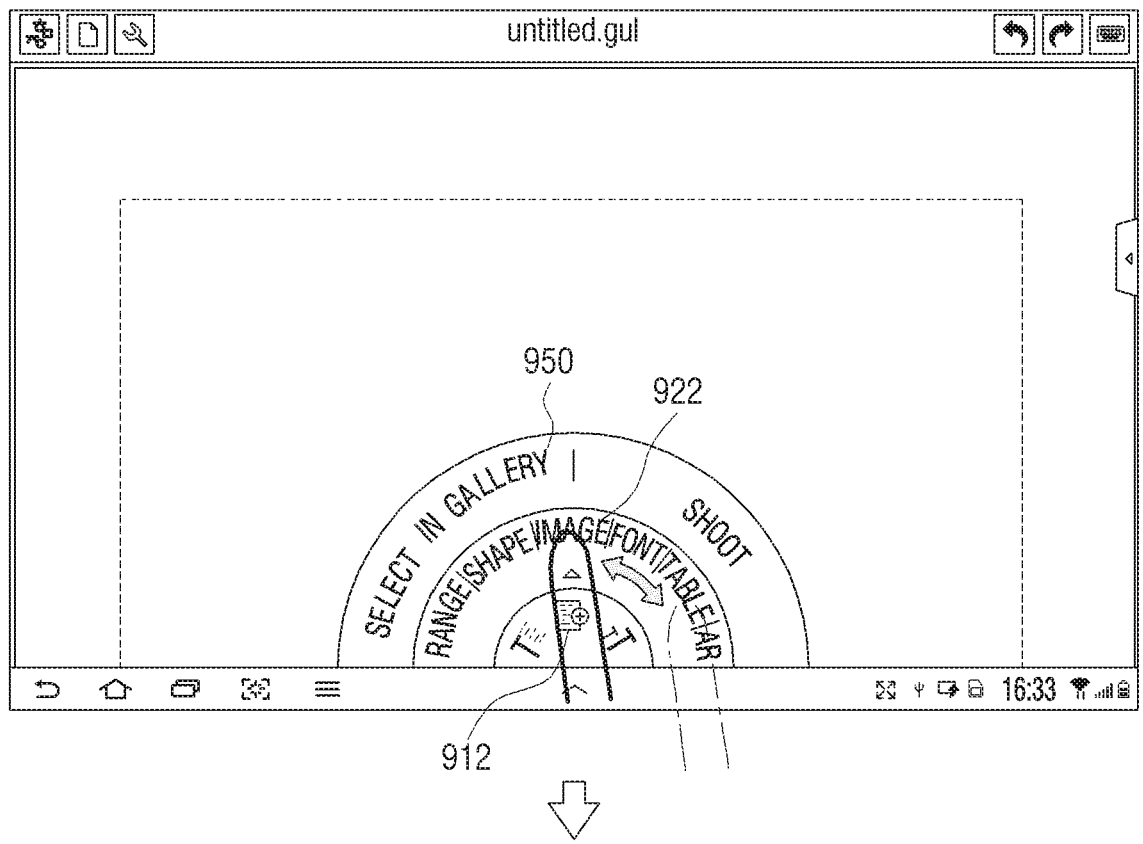
Figure 9E:
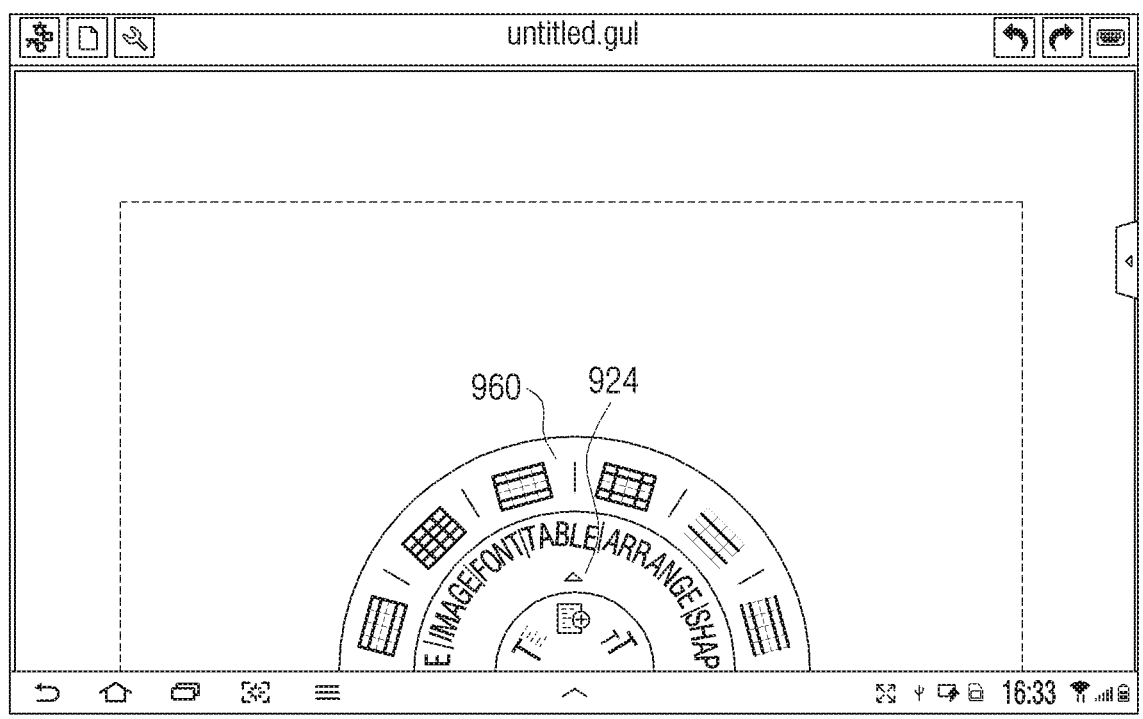

Referring to FIG. 9E, in a state in which lower-level menus corresponding to the selected image item 922 are displayed in the third region 950, and when the table item 924 from among the lower-leveled menus displayed in the second region is rotated to move to the central region of the hemispherical-shaped UI by a touch and drag operation, then lower-level menus included in the table item 924 may be displayed in the third region 960. For example, as illustrated in FIG. 9E, the items indicating various table types as the lower-level menus included in the table item 924 may be displayed in the third region 960. At this time, even when the item selected by the drag and drop operation is not located in the central region, then it may be implemented that when the selected item enters a preset range from the center of the hemispherical-shaped UI by the rotation, the selected item automatically moves to and is displayed in the central region.

Referring to FIGS. 9D and 9E, the selection of the specific menu item may be performed by the click operation with respect to the menu item and also by the operation for moving a location of the menu item to the central region of the hemispherical-shaped UI. However, the present disclosure is not limited thereto, and the selection of the specific menu item may be performed by any suitable selection method and/or manner.

Figure 10A:
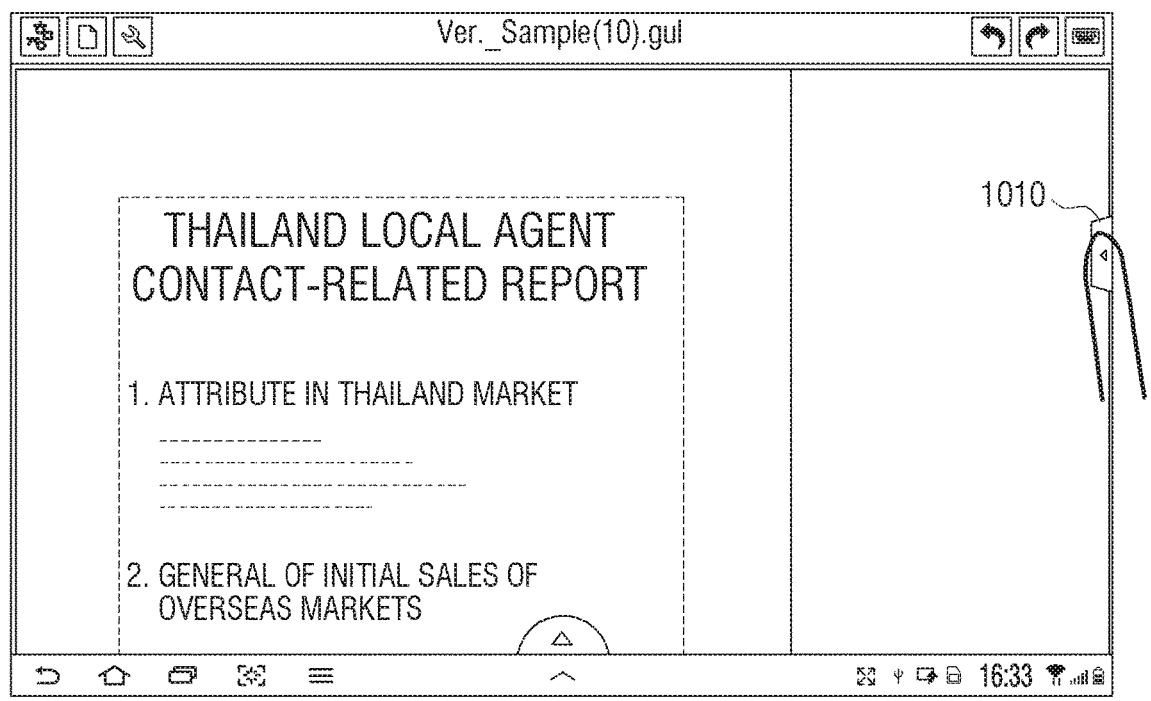
FIGS. 10A and 10B are views illustrating a User Interface (UI) providing method according to an embodiment of the present disclosure.
Figure 10A:
Figure 10A:
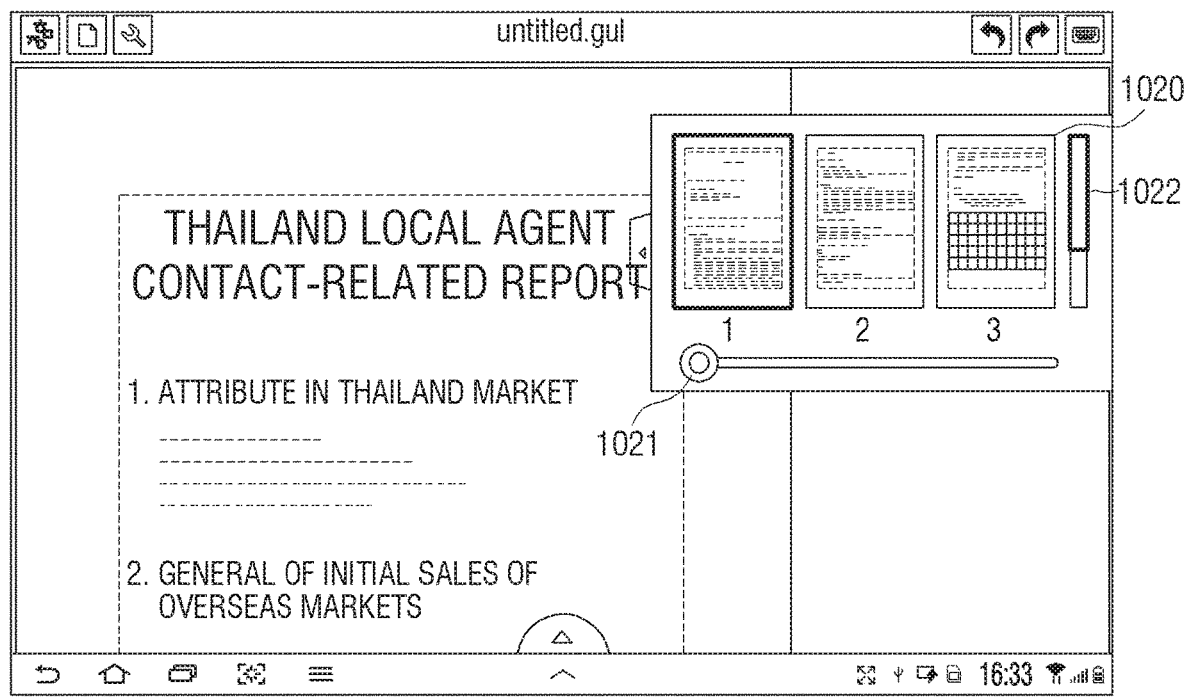
Figure 10B:
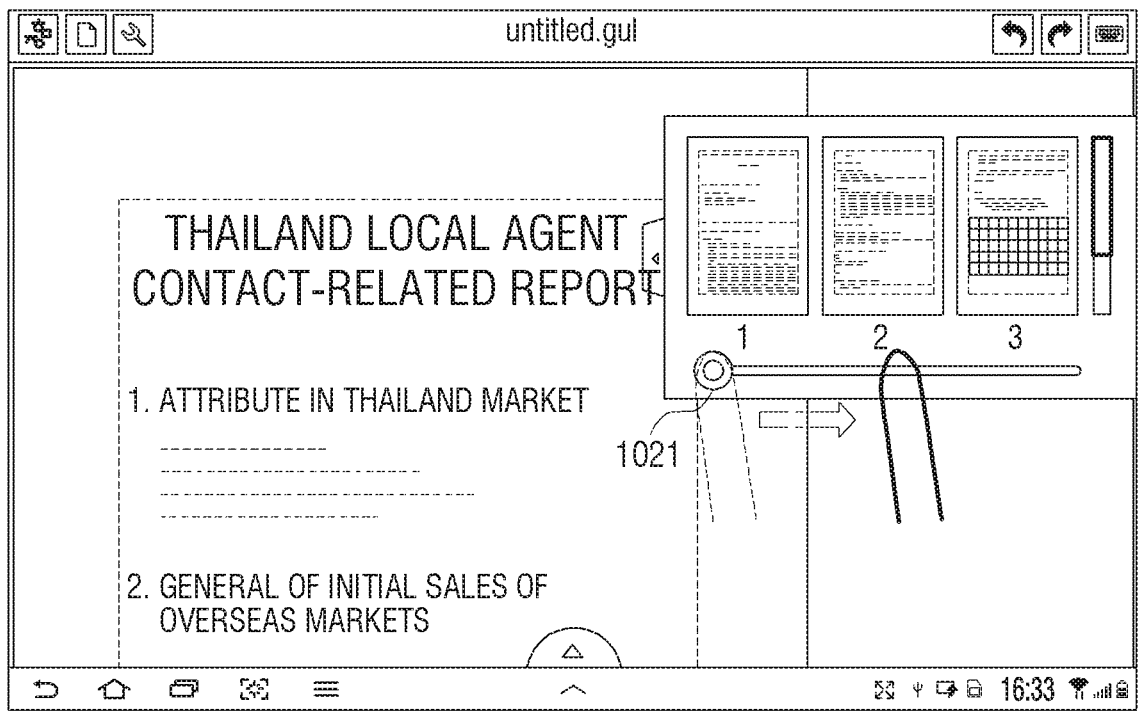
Figure 10B:
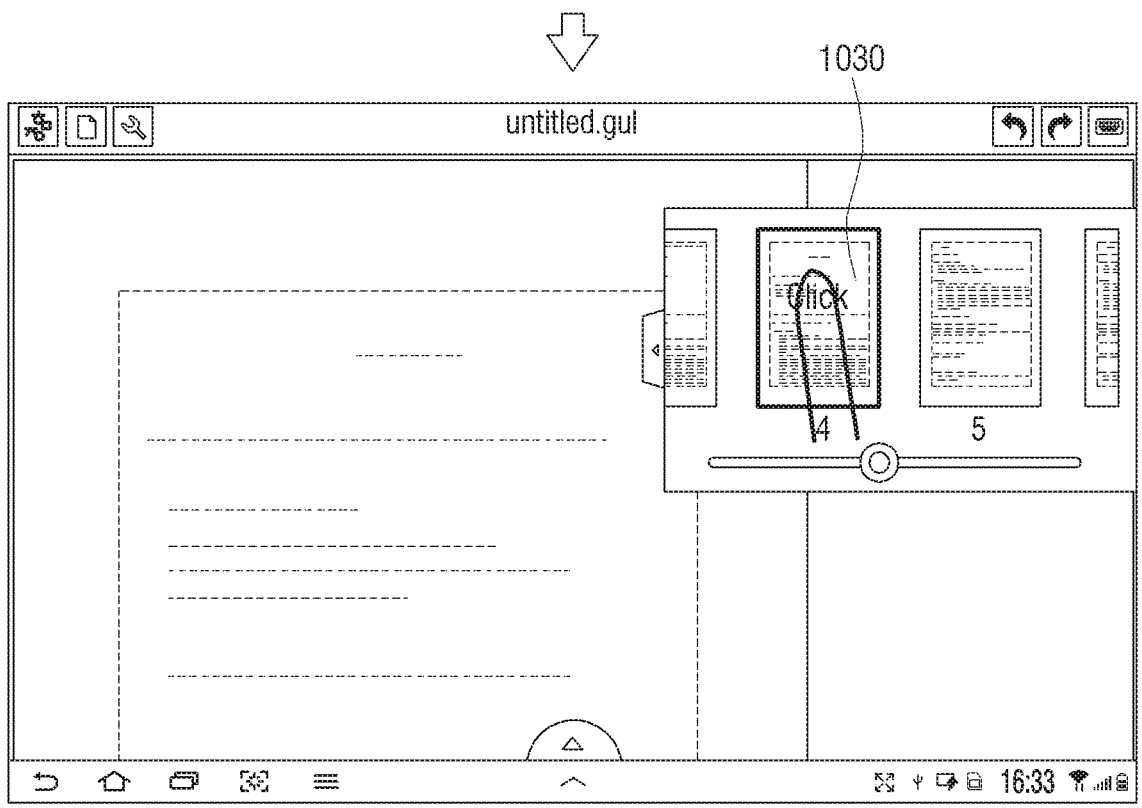

FIGS. 10A and 10B are views illustrating a UI providing method according to an embodiment of the present disclosure.

Referring to FIG. 10A, a menu icon 1010 for displaying a thumbnail of a document pre-created may be displayed in a corner region of a document creation menu. For example, the menu icon 1010 may be displayed in a right corner region of the document creation screen, however, the present disclosure is not limited thereto and the menu icon 1010 may be displayed at any suitable location. Here, the pre-created document may be defined as a page connected to the currently displayed page, that is, a pre-created page of the same file. However, the present disclosure is not limited thereto, and in some cases, a file document separate from the currently displayed document may be displayed.

Referring to FIG. 10A, when the menu icon 1010 is click-operated, a region for fast scrolling the thumbnail of the pre-created document may be extended from a menu region 1020 and then displayed. At this time, a first scroll bar 1021 for horizontal scroll and a second scroll bar 1022 for vertical scroll may be displayed in the menu region 1020, and a page number may be displayed below each of document thumbnails.

Referring to FIG. 10B, the user may operate the first scroll bar 1021 to fast scroll the pre-created document. Further, when the user click-operates a thumbnail of a specific document 1030 during the scrolling, the document 1030 may be displayed on a screen.

Figure 11A:
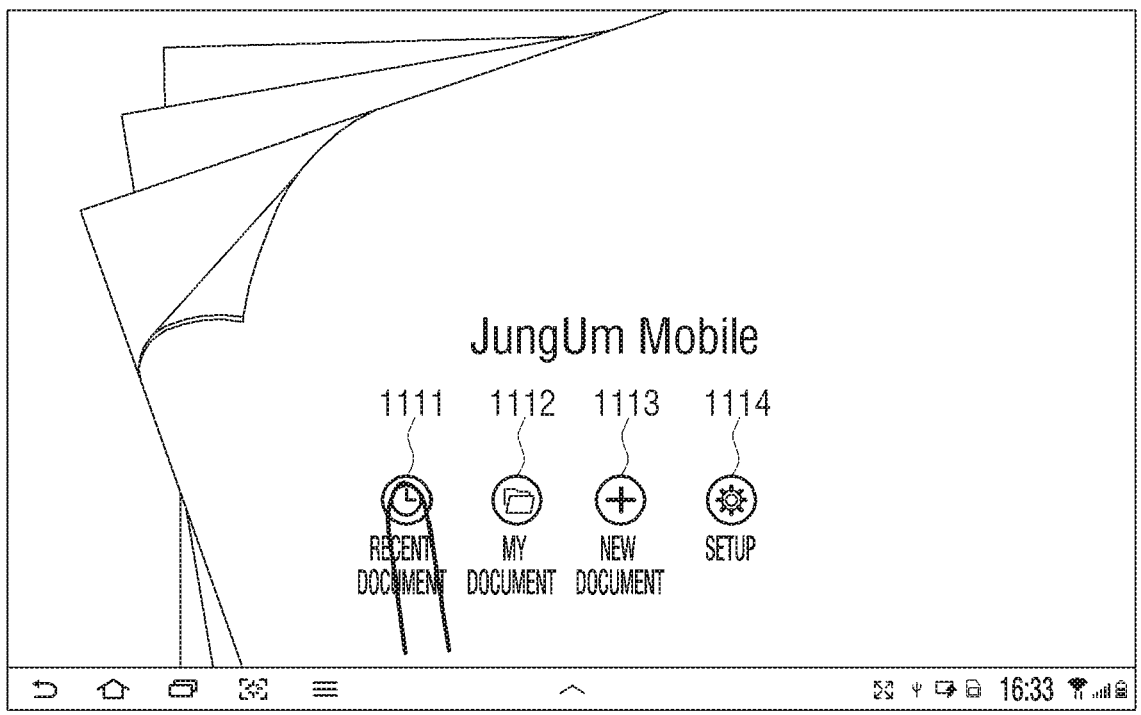
FIGS. 11A and 11B are views illustrating a UI providing method according to another embodiment of the present disclosure.
Figure 11A:
Figure 11A:
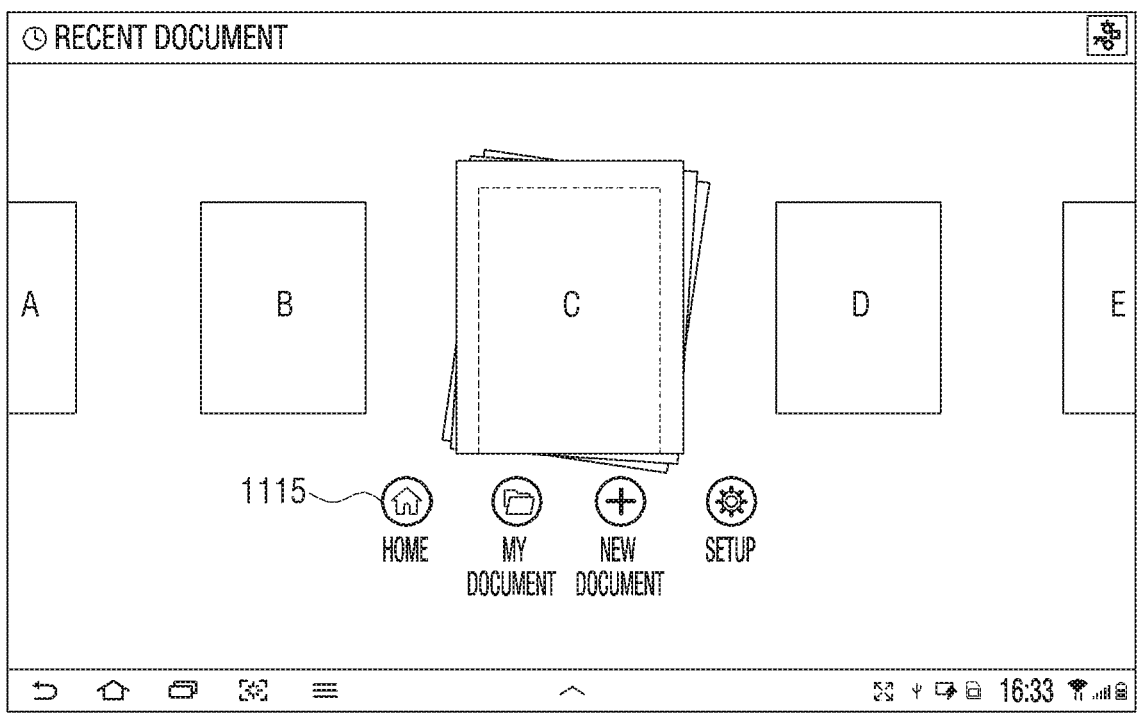
Figure 11B:
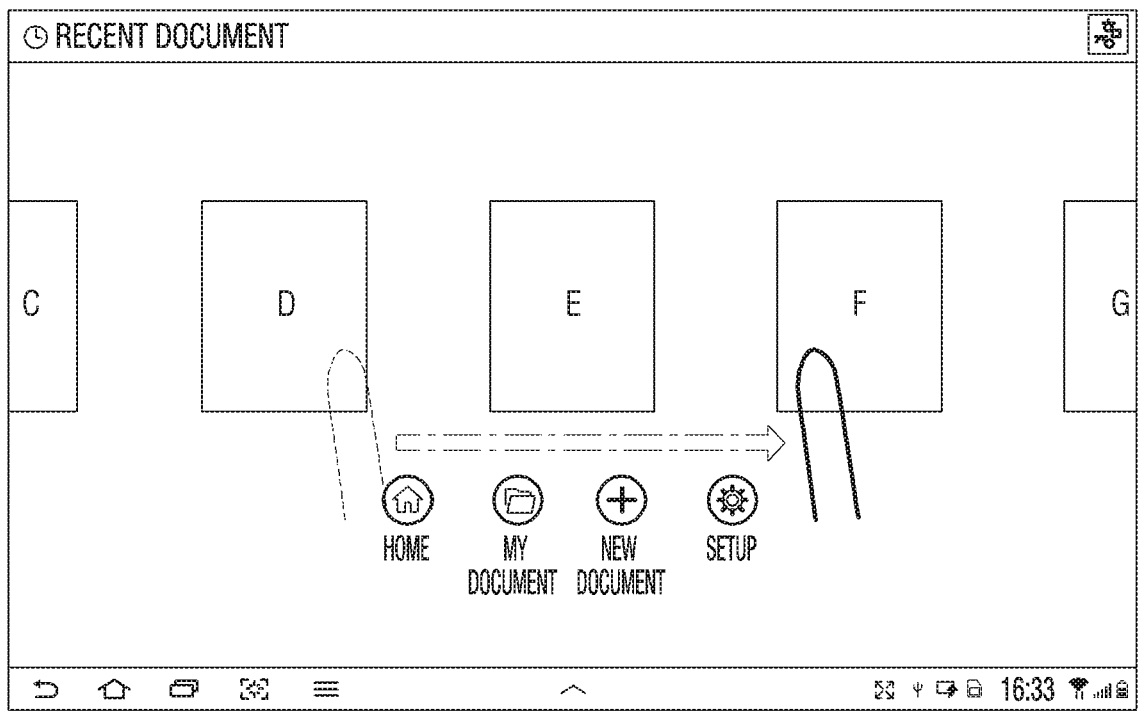
Figure 11B:
Figure 11B:
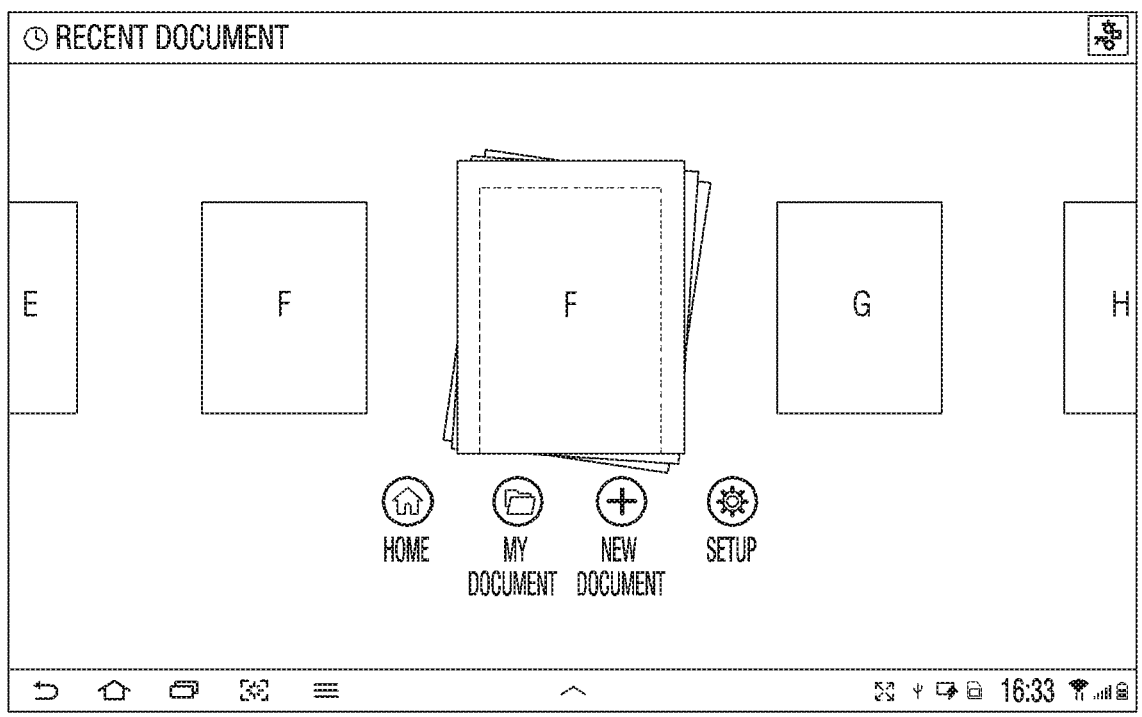

FIGS. 11A and 11B are views illustrating a UI providing method according to another embodiment of the present disclosure.

When a document editing program according to an embodiment is executed, as illustrated in FIG. 11A, an initial screen may be displayed. For example, when an application is selected by a user's operation, the initial screen may include menu icons such as a recent document icon 1111, a my document icon 1112, a new document icon 1113, and a setup icon 1114, may be displayed.

When the recent document icon 1111 for displaying a recent document is selected, then thumbnails A to E of recent document, which were used by the document editing program, may be displayed in a row. Here, the recent documents may be defined as different files. The document thumbnail C located in the center may be extended and displayed to be different from other thumbnails in a form in which multiple documents are superimposed. Further, the recent document menu icon 1111 selected by the user may disappear and then another menu icon 1115 for displaying a home screen may be displayed in a corresponding location.

Subsequently, as illustrated in FIG. 11B, when a document thumbnail moves according to a user's touch and drag operation, the document superimposition may disappear during the moving. When the user's drag operation stops, a document thumbnail F located in the center may be extended and displayed to be different from the other thumbnails in a form in which multiple documents are superimposed.

Figure 12:
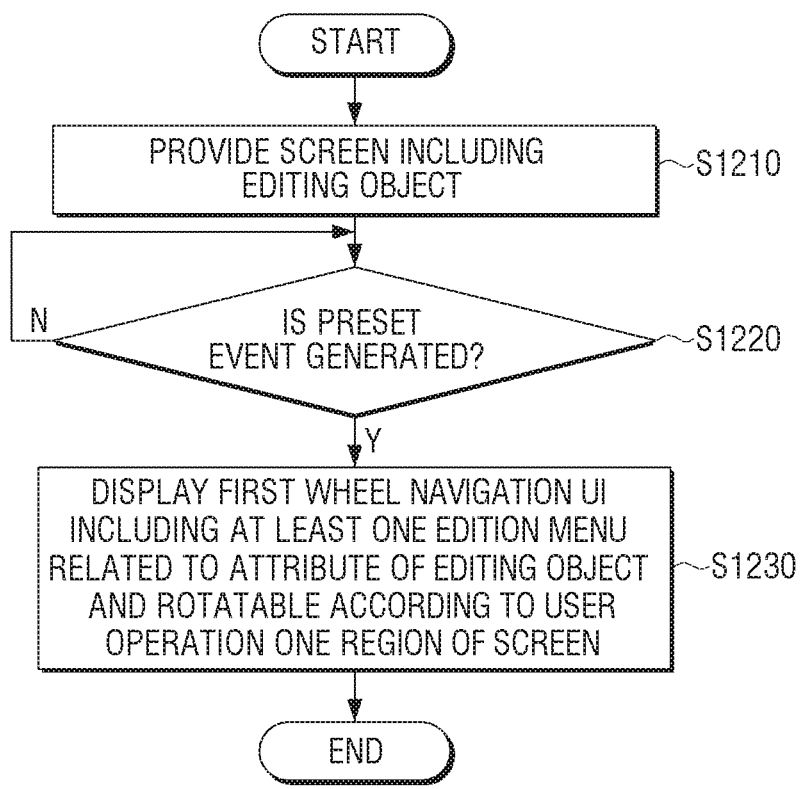
FIG. 12 is a flowchart illustrating a method of controlling a user terminal apparatus according to an embodiment of the present disclosure.

FIG. 12 is a flowchart illustrating a method of controlling a user terminal apparatus according to an embodiment of the present disclosure.

Referring to FIG. 12, according to a method of controlling a user terminal apparatus, first, a screen including an editing object is provided at operation S1210. Subsequently, when a preset event is detected at operation S1220, a first wheel navigation UI, including at least one editing menu related to an attribute of an editing object, the editing menu being rotatable according to a user's operation, is displayed in one region of a screen at operation S1230. Here, the preset event may be a double-tap operation with respect to a preset region including an editing object.

When an editing menu is selected on the first wheel navigation UI, a second wheel navigation UI including a lower-level menu of the selected editing menu may be displayed. The second wheel navigation UI may include a return button configured to return to the first wheel navigation UI.

When a user's operation within a preset region on the first wheel navigation UI is detected, it may be indicated that the first wheel navigation UI is in a movable state to indicate that the first wheel navigation UI is movable. Next, when a user's drag operation is detected in the movable state, the location of the first wheel navigation UI may be moved and displayed according to the user's drag operation. Here, the user's operation with respect to the preset region may be a long-tap operation with respect to a central region of the first wheel navigation UI.

When there is a preset touch operation with respect to an arbitrary region on a screen after an editing object is copied through a copy menu included on the first wheel navigation UI, then a paste menu may be displayed within a preset distance range from a region on the screen in which a cursor is located. A third wheel navigation UI having a hemispherical-shaped UI disposed in a corner region and including a preset basic editing menu may also be displayed.

When one of the plurality of upper-level menus constituting the basic editing menu is selected by a touch operation, then the third wheel navigation UI is rotated to move the selected upper-leveled menu to a preset location, and a lower-level menu corresponding to the selected upper-leveled menu may be extended to and displayed in a hemispherical-shaped peripheral region.

When one of a plurality of upper-level menus constituting a basic editing menu moves to a preset location according to a user's rotation operation, then a lower-leveled menu corresponding to the moved upper-level menu may be extended to and displayed in the hemispherical-shaped peripheral region. When the third wheel navigation UI is rotated according to a user's touch operation, haptic feedback according to a rotation state may be provided.

According to the above-described embodiment, intuitive and convenient UI may be provided. The control method of a user terminal apparatus according to the above-described various embodiments may be implemented in a program to be provided to the apparatus. For example, a non-transitory computer-recordable medium, in which a program for executing the above described embodiment may be provided. The control method may be executed by a hardware elements such as a controller, a processor, a computer chip, an Integrated Circuit (IC), or any other similar and/or suitable hardware element.

The non-transitory computer-recordable medium may be a computer-readable medium configured to store data. Specifically, the above-described applications or programs may be stored and provided in the non-transitory apparatus-readable medium such as a Compact Disc (CD), a Digital Versatile Disc (DVD), a hard disc, a Blu-ray disc, a universal serial bus (USB), a memory card, a Read Only Memory (ROM), a magnetic storage device, an optical storage device, and any suitable and/or similar non-transitory computer-recordable medium.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A user terminal comprising:
a touch screen; and
a controller configured to control to:
control the touch screen to display a content based on receiving a user input, control the touch screen to display a first User Interface (UI) including a first editing menu related to an attribute of the content in a region of the touch screen, wherein the first UI is in a form of at least a portion of a circle having a center within a display area of the touch screen, control the touch screen to display a second UI comprising a second editing menu related to a selected menu item, based on a selection of one of a plurality of menu items included in the first editing menu, when the second UI comprises a wheel navigation UI rotated according to a user's operation, provide haptic feedback corresponding to a rotation of the second UI based on the second UI being rotated in a dial form according to a second user input, control the touch screen to display the first UI by changing the first UI to indicate that the first UI is in a movable state, based on a third user input on a predetermined region of the first UI being identified, control the touch screen to display by moving a location of the first UI based on a touch drag input of the user in a state indicating that the first UI is in the movable state, wherein the movable state is indicated by changing a color of the first UI in size, and display the first UI and the second UI of hemispherical shape, the first UI and the second UI being disposed in a corner region on the screen.

2. The user terminal as claimed in claim 1, wherein the user input for the content includes a double-tap touch input of the user with respect to a predetermined region including the content.

3. The user terminal as claimed in claim 1,
wherein the second editing menu comprises a lower level menu item of the selected menu item, and
wherein the second UI includes a return button configured to return to displaying the first UI.

4. The user terminal as claimed in claim 1,
wherein the third user input on the predetermined region of the first UI is a long-tap touch input with respect to a central region of the first UI.

5. The user terminal as claimed in claim 1, wherein, after the content is copied through a copy menu from among editing menus included in the first UI based on a fourth user input being identified, the controller is further configured to control to display a paste menu in a predetermined distance range from a region in which a cursor is located on the touch screen.

6. The user terminal as claimed in claim 1, wherein the controller is further configured to control to display a third UI of a hemispherical shape, the third UI being disposed in a corner region on the screen and including a third menu according to a fourth user input, the third menu being a preset basic editing menu.

7. The user terminal as claimed in claim 6,
wherein, based on one from among a plurality of upper-level menus constituting the third menu being selected by a fifth user input, the controller moves the selected upper-level menu to a predetermined location by rotating the third UI, and
wherein the controller is further configured to control to display by extending a lower-level menu corresponding to the selected upper-level menu in a peripheral region of a hemispherical shape.

8. The user terminal as claimed in claim 6, wherein, based on one from among a plurality of upper-level menus constituting the third menu moving to a predetermined location by a fifth user input for rotating the third UI, the controller controls to display by extending a lower-level menu corresponding to the moved upper-level menu in a peripheral region of the hemispherical shape.

9. The user terminal as claimed in claim 6,
wherein the controller is further configured to control to provide haptic feedback according to a current rotation state of the third UI based on the third UI being rotated according to a fifth user input.

10. A method of controlling a user terminal apparatus, the method comprising:
displaying a content on a touch screen;
displaying a first User Interface (UI) including a first editing menu related to an attribute of the content in a region of the touch screen, based on receiving a user input, wherein the first UI is in a form of at least a portion of a circle having a center within a display area of the touch screen;
displaying a second UI comprising a second editing menu related to a selected menu item based on a selection of one of a plurality of menu items included in the first editing menu;
when the second UI comprises a wheel navigation UI rotated according to a user's operation, providing haptic feedback corresponding to a rotation of the second UI based on the second UI being rotated in a dial form according to a second user input;
displaying the first UI by changing the first UI to indicate that the first UI is in a movable state, based on a third user input on a predetermined region of the first UI being identified;
displaying by moving a location of the first UI based on a touch drag input of the user in a state indicating that the first UI is in the movable state, wherein the movable state is indicated by changing a color of the first UI in size; and
displaying the first UI and the second UI of hemispherical shape, the first UI and the second UI being disposed in a corner region on the screen.

11. The method as claimed in claim 10, further comprising, when the second editing menu comprises a lower level menu item of the selected menu item, displaying a second UI including a lower-level menu of the selected editing menu.

12. The method as claimed in claim 10, wherein the second UI includes a return button configured to return to displaying the first UI.

13. The method as claimed in claim 10,
wherein the third user input on the predetermined region of the first UI is a long-tap touch input with respect to a central region of the first UI.

14. The method as claimed in claim 10, further comprising, after the content is copied through a copy menu from among editing menus included in the first UI, based on a fourth user input being identified, displaying a paste menu in a predetermined distance range from a region in which a cursor is located on the touch screen.

15. The method as claimed in claim 10, further comprising displaying a third UI of a hemispherical shape, the third UI being disposed in a region on the screen and including a third menu according to a fourth user input, the third menu being a preset basic editing menu.

16. The method as claimed in claim 15, further comprising,
based on one from among a plurality of upper-level menus constituting the third menu being selected, moving the selected upper-level menu to a predetermined location by rotating the third UI; and displaying by extending a lower-level menu corresponding to the selected upper-level menu in a peripheral region of a hemispherical shape.

17. The method as claimed in claim 15, further comprising, based on one from among a plurality of upper-level menus constituting the third menu moving to a predetermined location by a fifth user input for rotating the third UI, displaying by extending a lower-level menu corresponding to the moved upper-level menu in a peripheral region of a hemispherical shape.

18. The method as claimed in claim 15, further comprising providing haptic feedback according to a current rotation state of the third UI based on the third UI being rotated according to a fifth user input.

* * * * *